United States Patent
Yamada et al.

(10) Patent No.: US 8,506,397 B2
(45) Date of Patent: Aug. 13, 2013

(54) STORAGE MEDIUM HAVING INFORMATION PROCESSING PROGRAM STORED THEREIN, INFORMATION PROCESSING DEVICE, INFORMATION PROCESSING SYSTEM, AND MAP DISPLAY METHOD

(75) Inventors: Yoichi Yamada, Kyoto (JP); Hidemaro Fujibayashi, Kyoto (JP); Yutaka Hiramuki, Kyoto (JP); Hiromu Takemura, Kyoto (JP); Ryo Tanaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 251 days.

(21) Appl. No.: 12/883,569

(22) Filed: Sep. 16, 2010

(65) Prior Publication Data

US 2011/0306411 A1    Dec. 15, 2011

(30) Foreign Application Priority Data

Jun. 11, 2010   (JP) .................................. 2010-133509

(51) Int. Cl.
  *A63F 9/24*    (2006.01)
  *A63F 13/00*   (2006.01)
  *G06F 17/00*   (2006.01)
  *G06F 19/00*   (2011.01)

(52) U.S. Cl.
  USPC .......................................................... 463/31

(58) Field of Classification Search
  USPC .......................................................... 463/31
  See application file for complete search history.

(56) References Cited

U.S. PATENT DOCUMENTS 6,821,204 B2   11/2004   Aonuma et al.
7,744,465 B2    6/2010   Suzuki et al.

FOREIGN PATENT DOCUMENTS

JP    2003-325973    11/2003
JP    2005-230263     9/2005

OTHER PUBLICATIONS

World of Warcraft patch 2.1.0, May 22, 2007, game manual.*
WoW interface (http://www.wowinterface.com/forums/showthread.php?t=12868), Oct. 11, 2007.*
Rift discussion (http://forums.riftgame.com/rift-general-discussions/general-discussion/69177-minimap-rotation-anyone.html), discussion based on existing features in WoW.*
WoW patch notes (http://us.battle.net/wow/en/game/patch-notes/2-1-0).*
Moby Games (http://www.mobygames.com/game/windows/world-of-warcraft-wrath-of-the-lich-king/screenshots/gameShotId,342165/), Dec. 7, 2008.*
Yahoo Answers (http://answers.yahoo.com/question/index?qid=20081217153444AAoQRpW), 2008.*
"Final Fantasy IX," Nov. 14, 2000, Square, game manual.*
JimmyPMV, "Final Fantasy IX walkthrough," Feb. 11, 2012, Square, video evidence.*

* cited by examiner

*Primary Examiner* — Michael Cuff
*Assistant Examiner* — Kevin Y Kim
(74) *Attorney, Agent, or Firm* — Nixon & Vanderhye, P.C.

(57) ABSTRACT

A game apparatus displays on a screen an image of a virtual space as viewed from a predetermined viewing direction. The game apparatus displays a viewing direction map in response to a predetermined condition being satisfied, such that the viewing direction is set to a predetermined direction on the screen. Furthermore, the game apparatus displays a fixed direction map in response to a predetermined condition being satisfied, such that a direction preset in the virtual space is set to a predetermined direction on the screen. Note that when map images are displayed, the fixed direction map is preferably displayed after the viewing direction map.

17 Claims, 13 Drawing Sheets

STORAGE MEDIUM HAVING INFORMATION PROCESSING PROGRAM STORED THEREIN, INFORMATION PROCESSING DEVICE, INFORMATION PROCESSING SYSTEM, AND MAP DISPLAY METHOD

CROSS REFERENCE TO RELATED APPLICATION

The disclosure of Japanese Patent Application No. 2010-133509, filed Jun. 11, 2010, is incorporated herein by reference.

BACKGROUND OF THE INVENTION

1. Field of the Invention

The present invention relates to a storage medium having an information processing program stored therein, an information processing device, an information processing system, and a map display method, in which a map representing a virtual space is displayed on a screen.

2. Description of the Background Art

Conventionally, there is technology for displaying a three-dimensional image in a virtual space such as a game space as well as a two-dimensional map representing the virtual space. For example, Patent Document 1 (Japanese Laid-Open Patent Publication No. 2003-325973) describes a game apparatus in which a game is played by operating a player character in a three-dimensional virtual space. In this game apparatus, a map is displayed with a specific direction preset in the virtual space being an upward direction (see FIG. 8 of Patent Document 1).

Also, Patent Document 2 (Japanese Laid-Open Patent Publication No. 2005-230263) describes a game apparatus in which a map is displayed while being directed in accordance with a viewing direction of a virtual camera. In this game apparatus, an image of the virtual space as viewed from the position of the virtual camera is displayed and the map is displayed with the viewing direction of the virtual camera being an upward direction on the screen (see FIG. 22 of Patent Document 2).

In an approach as in Patent Document 1 where a map using a specific direction in a virtual space as a reference direction is displayed, the viewing direction in the virtual space does not correspond to the upward direction in the map displayed on the screen. As a result, the user has difficulty in comprehending the correspondence between the virtual space and the map. Specifically, the above approach has problems making comprehensible the viewing direction of the virtual camera on the map and the correspondence between objects located on the map and objects located in the virtual space.

On the other hand, in an approach as in Patent Document 2 where a map using the viewing direction of the virtual camera as a reference direction is displayed, the direction of the map displayed on the screen changes in accordance with the viewing direction of the virtual camera. In this approach, the direction of the map displayed on the screen is not fixed, and therefore it is difficult to comprehend the overall design of the virtual space and the current position in the virtual space. More specifically, the approach has problems making comprehensible the overall design of the virtual space in which, for example, "there is a mountain on the north side of a lake and there is a cave on the east side of the mountain", which makes it difficult to know the direction to take.

As described above, both the map using a specific direction in the virtual space as a reference direction and the map using the viewing direction of the virtual camera as a reference direction have disadvantages, and therefore a map with clear directions cannot be presented by simply displaying either of the maps.

SUMMARY OF THE INVENTION

Therefore, an objective of the present invention is to provide a storage medium having an information processing program stored therein, an information processing device, an information processing system, and a map display method, which are capable of presenting a map representing a virtual space to the user in a more comprehensible manner.

To solve the aforementioned problem, the present invention employs the following features (1) to (14).

(1) The present invention is directed to a computer-readable storage medium having stored therein an information processing program to be executed in a computer of an information processing device for displaying a map representing a virtual space. The program causes the computer to function as a virtual space display portion, a first map display portion, and a second map display portion. The virtual space display portion displays on a screen an image of the virtual space as viewed from a predetermined viewing direction. The first map display portion displays a first map in response to a predetermined condition being satisfied, such that the viewing direction is set to a predetermined direction on the screen. The second map display portion displays a second map in response to a predetermined condition being satisfied, such that a direction preset in the virtual space is set to a predetermined direction on the screen.

The "virtual space" may be any virtually constructed three-dimensional space, including a game space in an embodiment to be described later. Also, the "map" may be a two-dimensional map so long as it is an image representing a virtual space, and the image may be generated based on a three-dimensional space similar to the virtual space. For example, the "map" is not limited to a virtual space as viewed from directly above and may be a bird's eye map representing a virtual space as viewed from obliquely above. Furthermore, the "map" may be a map (simplified map) in which an object in a virtual space is represented by an icon, a graphic or the like in a simplified manner or may be a map (detailed map) in which the object is represented in a detailed manner (as in the image displayed by the virtual space display portion). Note that the image of the detailed map may be generated by the same method as that employed by the virtual space display portion, i.e., by using the virtual camera disposed in the virtual space.

The "information processing device" is a concept encompassing any computers performing information processing through execution of a computer program, in addition to a game apparatus described in the embodiment to be described later. Also, the "information processing device" may be of a hand-held type but this is not restrictive.

The "information processing program" is a concept encompassing any application programs to be executed by personal computers or hand-held devices and an example thereof is a game program described in the embodiment to be described later.

The "first map" may be any map so long as the viewing direction is set to the predetermined direction on the screen. In (3) specified below and in the embodiment to be described later, the first map represents a narrower area than the second map, but the first map is not limited to a map of a narrower area than the second map. Furthermore, in general, the "predetermined direction" mentioned in relation to the "first map display portion" is preferably the upward direction (on the screen) but it may be another direction.

The "second map" may be any map so long as it is displayed in a specific direction. Also, the "predetermined direction" mentioned in relation to the "second map display portion" may be any direction and does not have to coincide with the "predetermined direction" mentioned in relation to the "first map display portion".

The "predetermined condition" may be satisfied by, for example, receiving the user's instruction or, in the case where the present invention is applied to a game, the "predetermined condition" may be a condition set in the game (e.g., the condition being satisfied by a player character acquiring an item). Note that the "predetermined condition" mentioned in relation to the "first map display portion" may or may not be the same as the "predetermined condition" mentioned in relation to the "second map display portion".

According to the above feature (1), two maps, i.e., the first and second maps, can be displayed by the first map display portion and the second map display portion. Here, the first map is characterized by making comprehensible the correspondence between the virtual space and the map, while the second map is characterized by making comprehensible the overall design of the virtual space. That is, according to the above feature (1), two maps of different characteristics can be presented to the user. Accordingly, the user can view one of the two maps that better suits the circumstances and purpose, and therefore the present invention makes it possible to present maps to the user in a comprehensible manner.

(2) The first map display portion may display the first map in response to the predetermined condition being satisfied when the image of the virtual space is being displayed. Also, the second map display portion may display the second map in response to the predetermined condition being satisfied when the first map is being displayed.

In the foregoing, the "predetermined condition" mentioned in relation to the "first map display portion" may or may not be the same as the "predetermined condition" mentioned in relation to the "second map display portion".

According to the above feature (2), after the image of the virtual space (the space image) is displayed, the first map is initially displayed and then the second map is displayed. By initially displaying the first map after the space image, it becomes possible to allow the user to clearly comprehend the correspondence between the virtual space and the map. Then, the second map is displayed after the correspondence between the virtual space and the map is clearly comprehended, thereby offsetting the disadvantage of the second map, i.e., "incomprehensible correspondence between the virtual space and the map". Thus, according to the above feature (2), it is possible to present two maps to the player in a more comprehensible manner by displaying the maps in an appropriate order.

(3) The second map may represent a wider range than the first map.

According to the above feature (3), the first map, which makes comprehensible the correspondence between the virtual space and the map and is useful in confirming the surroundings of a viewpoint, is displayed as a map representing a relatively narrow range. On the other hand, the second map, which makes comprehensible the overall design of the virtual space, is displayed as a map representing a relatively wide range. Thus, according to the above feature (3), the display range can be set to suit the use of each map, thereby presenting the map to the user in a more comprehensible manner.

(4) The first map display portion may display the first map in a screen area where the image of the virtual space is displayed. Also, the second map display portion may display the second map in the screen area where the image of the virtual space is displayed.

According to the above feature (4), the map is displayed in the screen area where the space image is displayed, and therefore when the map is displayed, the display is switched from the space image to the map (i.e., the map is displayed after the space image disappears from the screen). Therefore, according to the above feature (4), when compared to the case where the space image and the map image are displayed at the same time, each image can be displayed in a large size, thereby presenting the map to the user in a comprehensible manner. Here, switching the display between the space image and the map is advantageous in that each image can be displayed in a large size, but when compared to the case where the space image and the map image are displayed at the same time, it is disadvantageous in that the correspondence between the space image and the map becomes less comprehensible. However, according to the present invention, such a disadvantage can be overcome by, for example, presenting two maps using the above feature (1), and therefore the present invention is particularly useful in switching the display between the space image and the map as in the case of the above feature (4).

(5) The information processing program may further cause the computer to function as a virtual camera setting portion for setting a virtual camera in the virtual space in accordance with a user's operation. In this case, the virtual space display portion displays the image of the virtual space using a viewing direction of the virtual camera set by the virtual camera setting portion as the predetermined viewing direction.

According to the above feature (5), the viewing direction in the virtual space image changes in accordance with the user's operation. In this manner, when the viewing direction in the virtual space image changes in accordance with the user's operation, the user might not be able to recognize the direction to which the viewing direction is set in the virtual space, and therefore it is particularly useful to present the first and second maps as in the present invention.

(6) The information processing program may further cause the computer to function as an object action control portion for controlling movement of an object in the virtual space in accordance with the user's operation. In this case, the virtual camera setting portion sets the viewing direction of the virtual camera based on either a position or a direction of the object, or both. The first map display portion displays an image representing the position of the object in the virtual space on the first map. The second map display portion displays an image representing the position of the object in the virtual space on the second map.

According to the above feature (6), the viewing direction of the virtual camera changes in response to the user moving the object. In this manner, when the viewing direction change in accordance with movement of the object operated by the user, the user might not be able to recognize the position of the object in the virtual space. In this regard, however, according to the above feature (6), an image representing the position of the object is displayed on both the first map and the second map, and therefore the user can readily recognize the position of the object in the virtual space with reference to the maps.

(7) The first map display portion may display the first map in response to a user giving a first instruction when the second map is being displayed. In this case, the virtual space display portion displays the image of the virtual space in response to the user giving a second instruction when the second map is being displayed.

According to the above feature (7), the user can switch the second map to the first map by the first instruction and also to the space image by the second instruction. Thus, the user can readily perform switching between each of the two maps and the space image.

(8) The virtual space display portion may display the image of the virtual space in response to the predetermined condition being satisfied when the first or second map is being displayed. In this case, the information processing program further causes the computer to function as a storage portion for storing information about a map displayed before the image of the virtual space. Also, the first map display portion displays the first map in response to the predetermined condition being satisfied when the image of the virtual space is being displayed and the storage portion has information about the first map stored therein. The second map display portion displays the second map in response to the predetermined condition being satisfied when the image of the virtual space is being displayed and the storage portion has information about the second map stored therein.

According to the above feature (8), when the display switches from the map (the first or second map) to the space image and then from the space image to the map, the map displayed before the space image is displayed. As a result, when the display switches to the map, the first map to be displayed is the same as the last displayed map, so that map presentation can be made comprehensible to the user. Also, this is particularly useful in the case where the user uses only one of the maps because the user does not have to perform any map switching operation.

(9) The first map display portion may display the first map in response to a user giving an instruction when the second map is being displayed. In this case, the second map display portion displays the second map in response to the user giving an instruction when the first map is being displayed.

According to the above feature (9), the user can alternatingly switch the display between two maps, and therefore can readily display a desired map.

(10) The information processing program may further cause the computer to function as a first position receiving portion and a first marker setting portion. The first position receiving portion accepts a first position specification instruction from the user when the image of the virtual space is being displayed, and the first position specification instruction specifies a position in the virtual space. The first marker setting portion sets a predetermined marker object in the position specified by the first position specification instruction, and the predetermined marker object is higher than any other object set in the virtual space. The first map display portion displays a predetermined marker image in a position on the first map that corresponds to the position specified by the first position specification instruction.

The "other object" refers to any object other than the marker object. Therefore, when a plurality of marker objects are set, the marker objects may be equal in height.

According to the above feature (10), by performing an operation to specify a position in the space image, the user can set a marker in the specified position. At this time, the position of the marker is reflected in the first map as well, and therefore the marker can be set both in the virtual space and on the map with a single operation. Also, a marker object is set higher than any other object in the virtual space, and therefore even if the marker object is positioned away from the viewpoint, the marker object can be distinctively displayed so that the user can visually recognize the marker object with ease.

(11) The information processing program may further cause the computer to function as a second position receiving portion and a second marker setting portion. The second position receiving portion accepts a second position specification instruction from a user when the first map is being displayed, and the second position specification instruction specifies a position on the first map. The second marker setting portion sets a predetermined marker object in a position in the virtual space that corresponds to the position specified by the second position specification instruction, and the predetermined marker object is higher than any other object set in the virtual space. In this case, the first map display portion displays a predetermined marker image in the position specified by the second position specification instruction.

According to the above feature (11), by performing an operation to specify a position on the map, the user can set a marker in the specified position. At this time, the position of the marker is reflected in the virtual space as well, and therefore the marker can be set both in the virtual space and on the map with a single operation. Also, a marker object is set higher than any other object in the virtual space, and therefore even if the marker object is positioned away from the viewpoint, the marker object can be distinctively displayed so that the user can visually recognize the marker object with ease.

(12) The virtual space display portion may display the image of the virtual space with the viewing direction changed to a downward direction in the virtual space in response to an instruction to display the first map. In this case, the first map display portion displays the first map in place of the image of the virtual space being displayed with the viewing direction changed to the downward direction.

As for "the viewing direction changed to a downward direction in the virtual space", the viewing direction may be simply changed without any other modification, or the change of the viewing direction may involve moving the position of the viewpoint as in the embodiment to be described later (FIG. 15). Also, the "downward direction" is not strictly limited to a vertically downward direction.

According to the above feature (12), when the first map is displayed after the space image, the first map is displayed after the image of the virtual space displayed with the viewing direction changed to the downward direction. Specifically, the display on the screen changes from a space image with a normal viewing direction to another space image with the same viewing direction as in the map, and then changes to the first map. As a result, the space image with the same viewing direction as in the first map is displayed before the first map, and therefore the user can more clearly comprehend the correspondence between the virtual space and the map when the first map is displayed.

(13) The virtual space display portion may display the image of the virtual space when an instruction is given to display the first map, such that the viewing direction is changed to a downward direction in the virtual space and the image of the virtual space gradually fades overtime. In this case, when the instruction is given to display the first map, the first map display portion displays the first map so as to gradually become sharp.

According to the above feature (13), when the first map is displayed after the space image, the image being displayed gradually changes from the image of the virtual space to the image of the first map. Thus, it is possible to make more comprehensible the correspondence between the virtual space and the map.

(14) The information processing program may further cause the computer to function as a rotational display portion for gradually rotating the first map from the viewing direction to a direction preset in the virtual space in response to a predetermined condition for displaying the second map being satisfied when the first map is being displayed. In this case, the second map display portion displays the second map after the first map is rotated by the rotational display portion.

According to the above feature (14), when the second map is displayed after the first map, the image of the first map seamlessly changes to the image of the second map. Thus, the correspondence between the first map and the second map can be presented to the user in a more comprehensible manner.

Also, the present invention may be embodied in the form of an information processing device including portions equivalent to the portions described above. In the information processing device, the above portions may be realized by a computer executing an information processing program, or part or all of the portions described above may be realized by specialized circuits. Furthermore, the present invention may be embodied in the form of an information processing system consisting of one or more information processing devices which include the portions described above. In this case, the one or more information processing devices may perform direct wire or wireless communication or may perform network communication. Moreover, the present invention may be embodied in the form of a map display method to be performed through the portions described above.

According to the present invention, by presenting two maps, i.e., the first and second maps, to the user, map presentation can be made comprehensible to the user.

These and other objects, features, aspects and advantages of the present invention will become more apparent from the following detailed description of the present invention when taken in conjunction with the accompanying drawings.

DESCRIPTION OF THE PREFERRED EMBODIMENTS

[Entire Structure of Game System]

Figure 1:
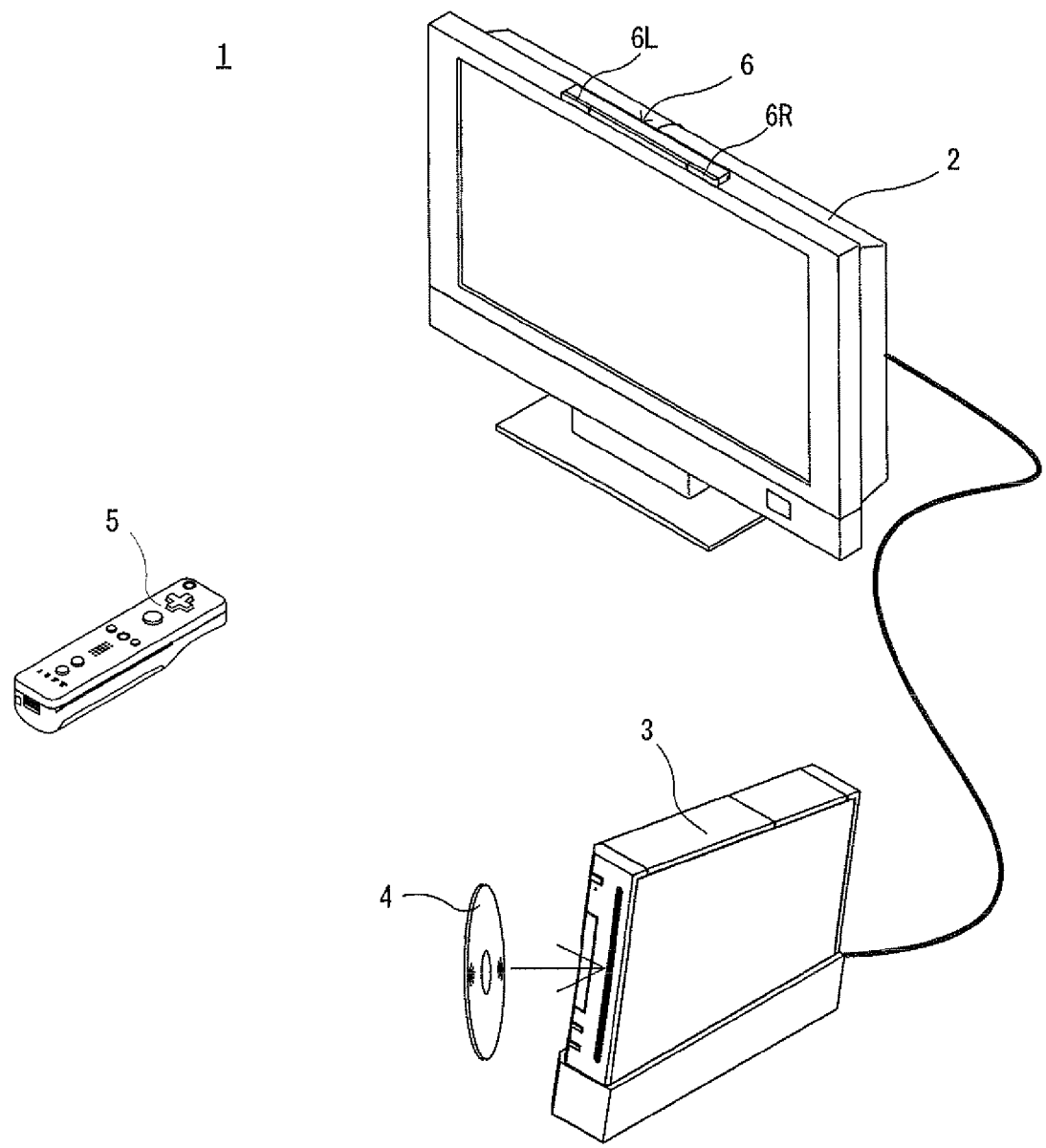
FIG. 1 is an external view of a game system.

With reference to FIG. 1, a game system 1 including a game apparatus which is an exemplary information processing device according to an embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, a controller 5, and a marker section 6. In this system, the game apparatus 3 performs a game process based on a game operation using the controller 5.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The controller 5 is an input device which provides operation data representing the content of an operation performed thereon to the game apparatus 3. Radio communication is made between the controller 5 and the game apparatus 3. In the present embodiment, the radio communication between the controller 5 and the game apparatus 3 is made using, for example, the Bluetooth (Registered Trademark) technology. In another embodiment, the connection between the controller 5 and the game apparatus 3 may be a wired connection.

[Internal Structure of Game Apparatus 3]

Figure 2:
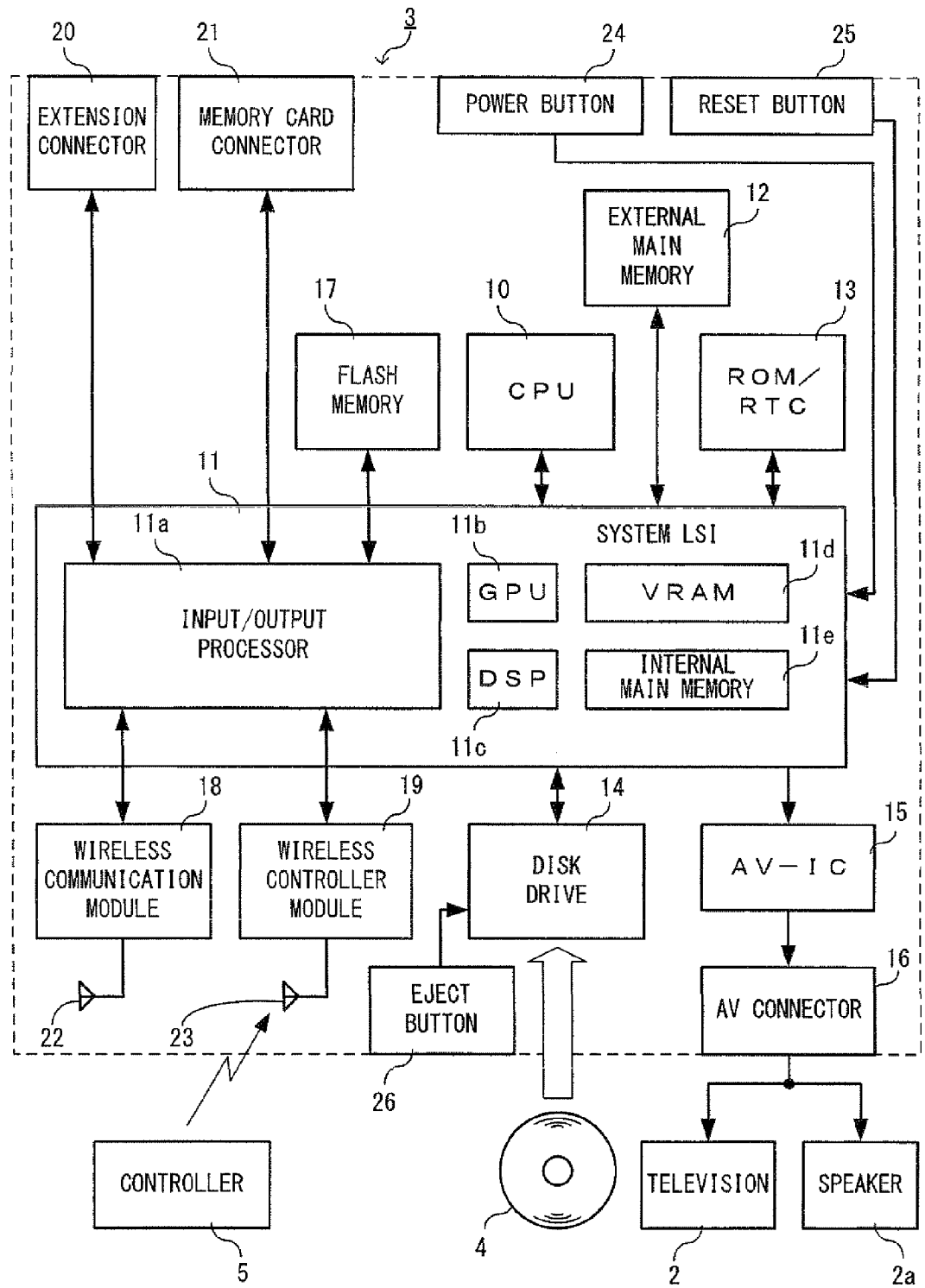
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of the Controller 5]

Figure 3:
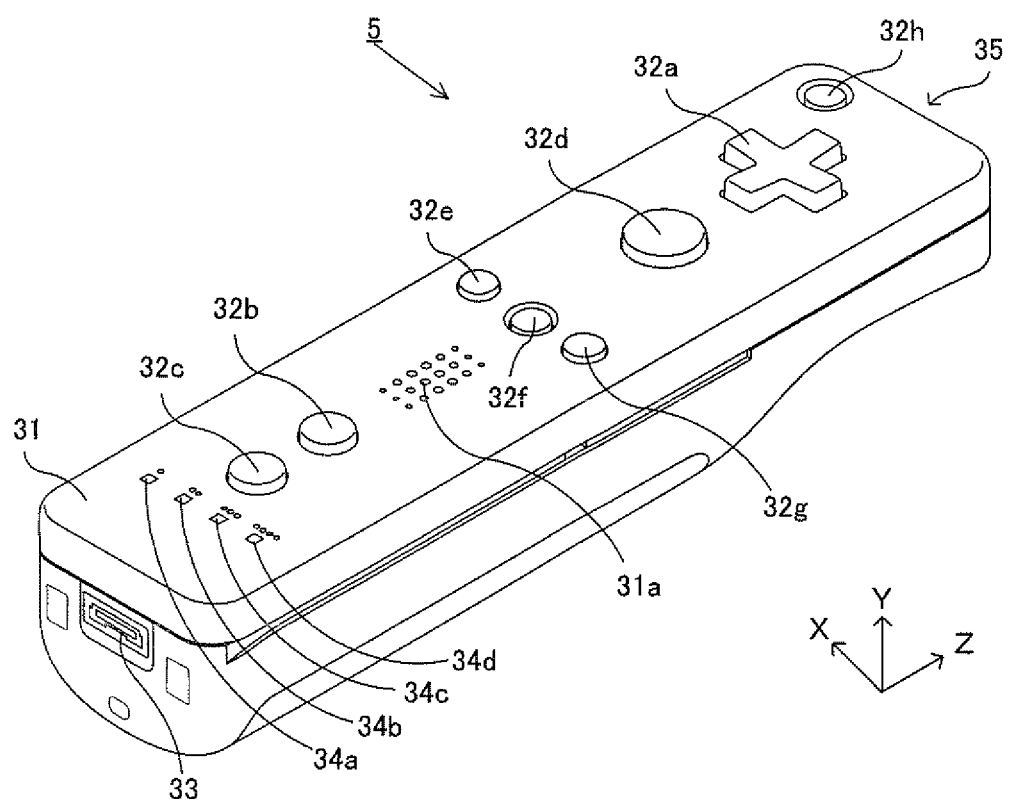
FIG. 3 is a perspective view illustrating an external structure of a controller.
Figure 4:
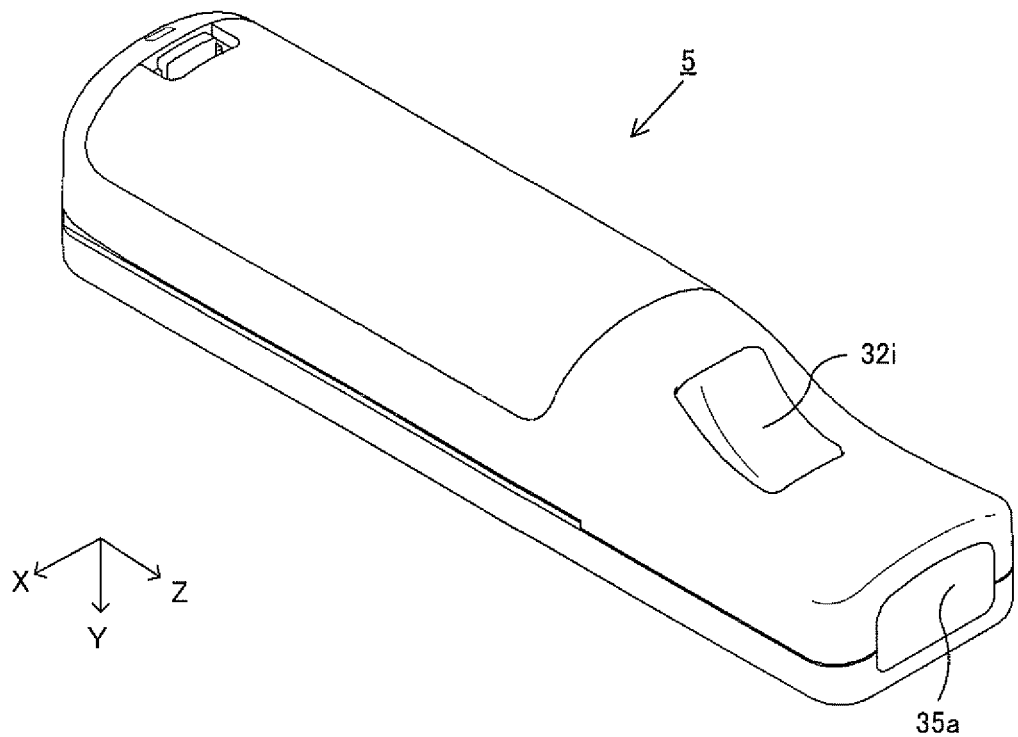
FIG. 4 is another perspective view illustrating an external structure of the controller.

Next, with reference to FIGS. 3 to 6, the controller 5 will be described. FIG. 3 is a perspective view illustrating an external structure of the controller 5. FIG. 4 is a perspective view illustrating an external structure of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation thereof.

The housing 31 has a plurality of operation buttons. As shown in FIG. 3, on the top surface of the housing 31, a cross button 32a, a button 32b numbered "1", a button 32c numbered "2", an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller to another device. Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the button 32b numbered "1" and the home button 32f.

Figure 5:
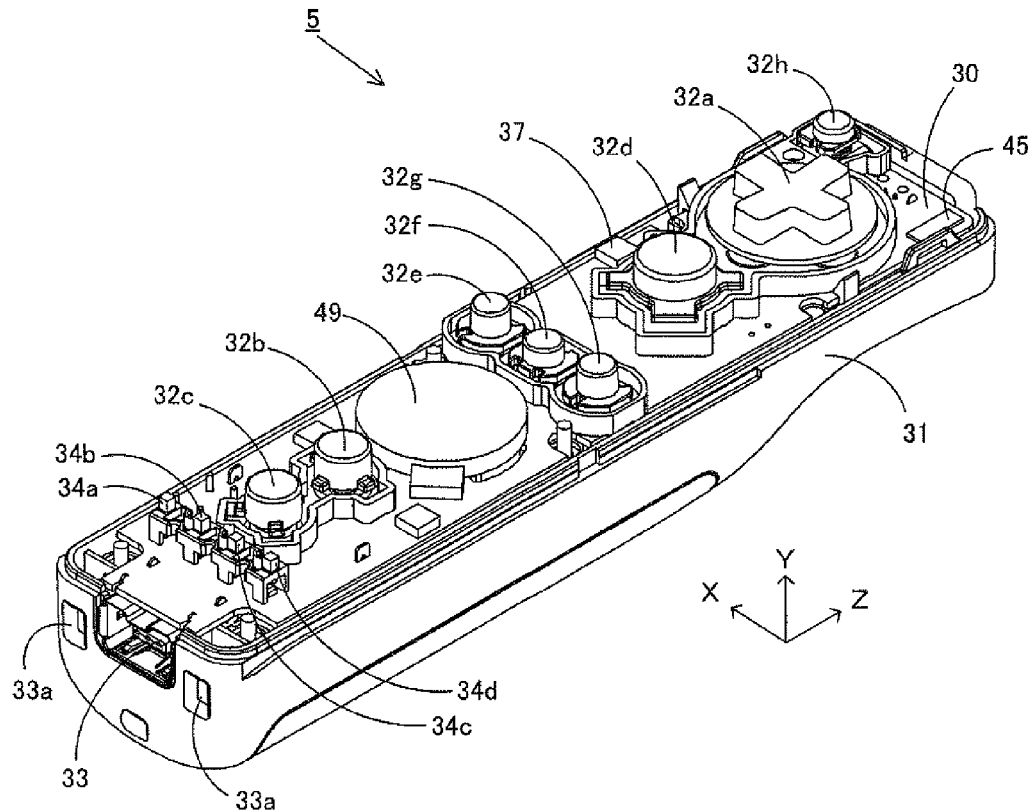
FIG. 5 is a diagram illustrating an internal structure of the controller.
Figure 6:
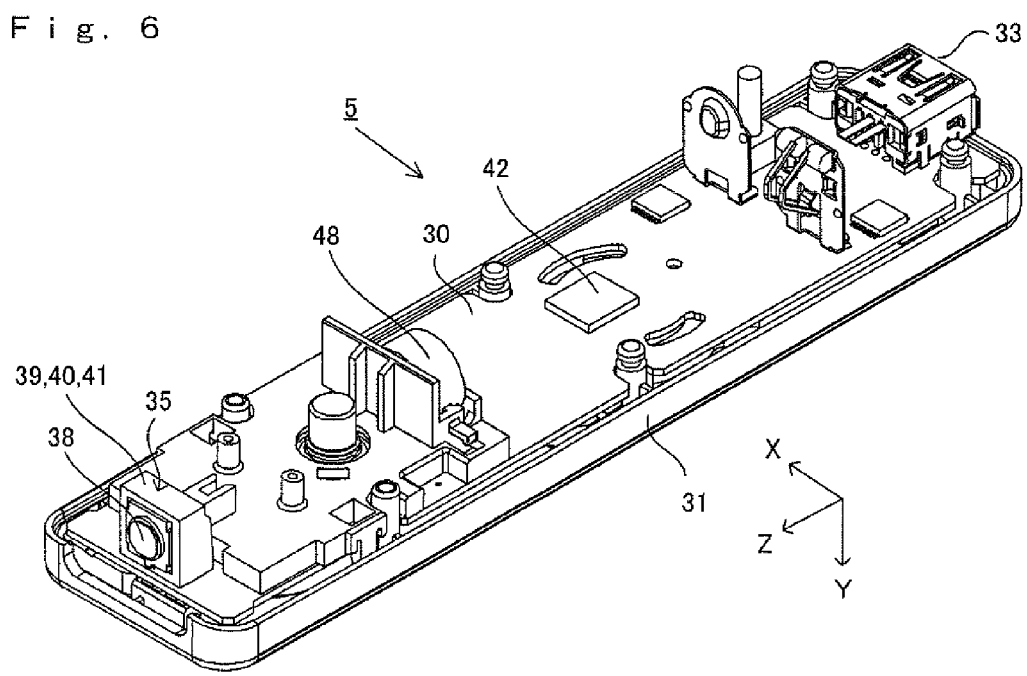
FIG. 6 is another diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (see FIG. 7) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

FIGS. 3 to 6 show only examples of the shape of the controller 5, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
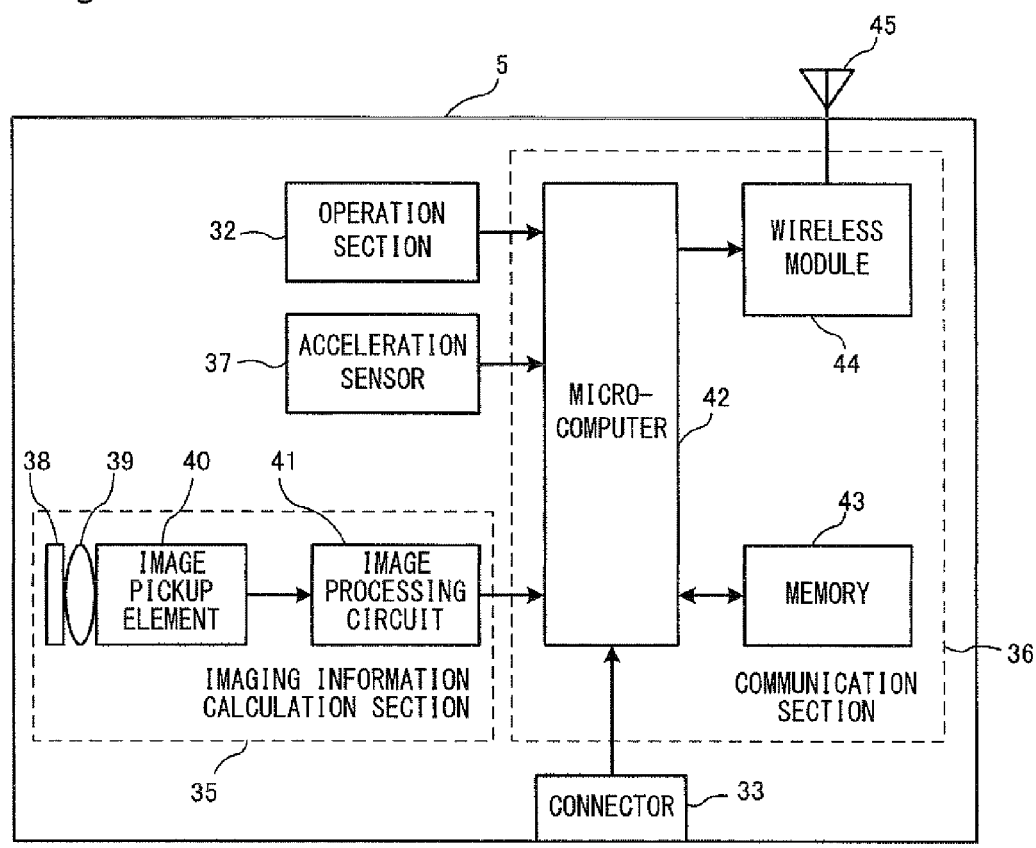
FIG. 7 is a block diagram illustrating a structure of the input device.

FIG. 7 is a block diagram illustrating a structure of the controller 5. The controller 5 includes an operation section 32 (the operation buttons 32a to 32i), the connector 33, the imaging information calculation section 35, a communication section 36, and the acceleration sensor 37. The controller 5 transmits, as operation data, data representing the content of an operation performed on the controller 5 itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the marker 6R and the marker 6L). The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax,ay,az) in an XYZ-coordinate system (controller coordinate system) defined relative to the controller 5. Hereinafter, a vector representing components of the acceleration values detected for the three axes, respectively, by the acceleration sensor 37 is referred to as an acceleration vector.

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acceleration data. In the present embodiment, the game apparatus 3 determines the orientation (angle of tilt) of the controller 5 based on the acceleration data. That is, the acceleration sensor 37 is used as a sensor for outputting data by which to determine the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

Note that in the present embodiment, for example, an electrostatic capacitance type acceleration sensor is used as a sensor for outputting a value that is variable in accordance with the movement of the controller, but an acceleration sensor of another type or a gyroscope. However, the acceleration sensor detects acceleration in the straight line direction along each axis, while the gyroscope detects a rotational angular rate. Accordingly, when the gyroscope is employed in place of the acceleration sensor, the replacement is not easy because signals to be detected by them vary in nature. Therefore, in the case where the gyroscope is used in place of the acceleration sensor to calculate the orientation (angle of tilt), the following changes are made, for example. Specifically, the game apparatus 3 initializes the value of orientation at the beginning of detection. Then, angular rate data outputted by the gyroscope is integrated. Furthermore, the amount of a change of the orientation from the initialized orientation value is calculated using the integration result. In this case, the calculated orientation is represented by an angle.

Note that as has already been described, in the case where the angle of tilt (orientation) is calculated by the acceleration sensor, the angle of tilt is calculated using an acceleration vector. Accordingly, the case where the acceleration sensor is used differs from the case where the gyroscope is used in that the calculated angle of tilt can be represented by a vector and an absolute direction can be calculated without initialization. Also, the nature of the value calculated as the angle of tilt varies depending on whether it is an angle or a vector as described above, and therefore when the acceleration sensor is replaced with the gyroscope, it is necessary to perform predetermined conversion on data for the angle of tilt.

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33.

Data outputted from the operation section 32, the imaging information calculation section 35, and the acceleration sensor 37 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

The controller 5 makes it possible for the player to perform an operation of moving the controller 5 itself in addition to conventional and general game operations of pressing the operation buttons. For example, it is possible to performs other operations, including tilting the controller 5 at an arbitrary angle of tilt, pointing at an arbitrary position on the screen with the controller 5 and swinging the controller 5.

[Outline of the Map Display]

Hereinafter, map display in a game process performed by the game apparatus 3 will be outlined with reference to FIGS. 8 to 12. In a game played by the game process, the player (user) operates a player character appearing in a three-dimensional virtual space (game space). In the game process, the three-dimensional virtual space is constructed, and an image of the virtual space is displayed on the screen of the television 2. Note that an image of the virtual space displayed on the screen will be referred to below as a "space image".

Figure 8:
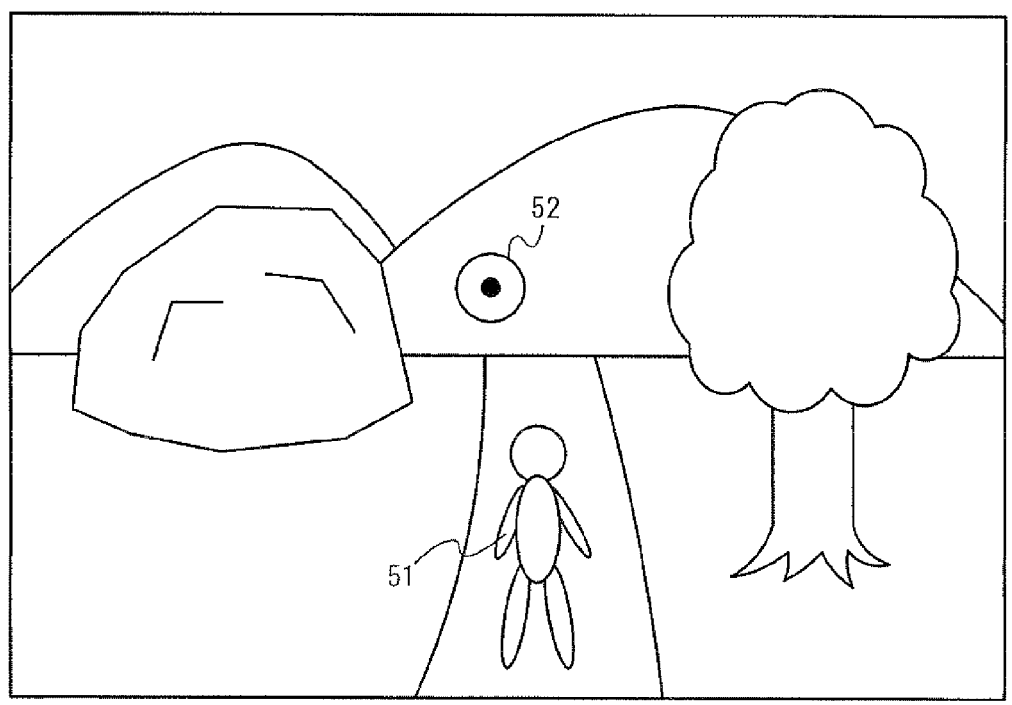
FIG. 8 is a diagram illustrating an exemplary space image.

FIG. 8 is a diagram illustrating an exemplary space image. As shown in FIG. 8, the space image is an image of the virtual space viewed in a predetermined viewing direction. In the present embodiment, a virtual camera is set in the virtual space, and an image of the virtual space viewed in the viewing direction of the virtual camera (the predetermined viewing direction) from the position of the virtual camera is displayed as a space image. Also, in FIG. 8, the space image includes a player character 51 to be operated by the player. In the present embodiment, the position and the orientation of the virtual camera are controlled in accordance with the position and the direction of the player character 51. Specifically, the position and the direction of the virtual camera are controlled such that the virtual camera is positioned behind the player character 51 with the orientation (viewing direction) thereof corresponding to a forward direction of the player character 51. Also, in FIG. 8, a cursor 52 is displayed along with the space image. The cursor 52 is an image for specifying a position in the virtual space, which is used to specify, for example, a position in which to set a marker object to be described later.

When the player performs a predetermined map display operation (e.g., an operation of pressing the button 32b numbered "1") with the space image being displayed, the game apparatus 3 generates and displays a map representing the virtual space. Here, in the present embodiment, the game apparatus 3 displays one of two maps, either a viewing direction map or a fixed direction map, as the map representing the virtual space.

Figure 9:
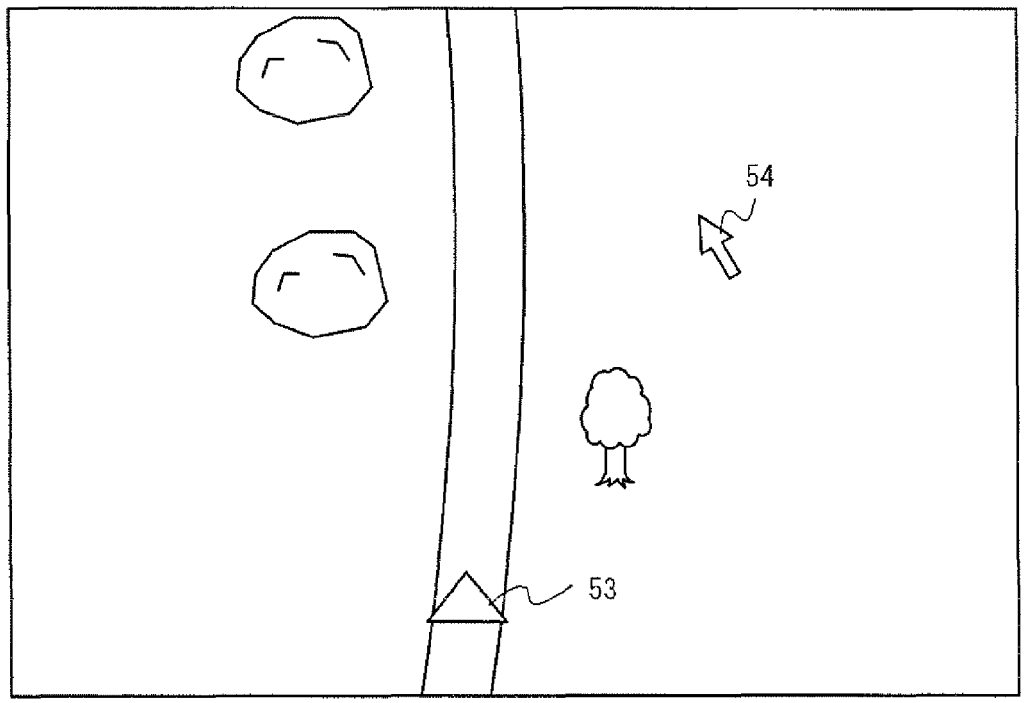
FIG. 9 is a diagram illustrating an exemplary viewing direction map.

When the map display operation is performed with the space image being displayed, the viewing direction map is initially displayed. FIG. 9 is a diagram illustrating an exemplary viewing direction map. Note that the viewing direction map shown in FIG. 9 corresponds to the space image shown in FIG. 8. In the viewing direction map, the viewing direction of the virtual camera is set upward on the screen, as shown in FIG. 9. The viewing direction map is advantageous in that the correspondence between the virtual space and the map can be readily comprehended since the viewing direction of the virtual camera is always set upward on the screen. Also, the viewing direction map represents a relatively narrow range within the virtual space (when compared to the fixed direction map). Note that the viewing direction map is displayed with a player mark 53 and a cursor 54 superimposed thereon, as shown in FIG. 9. The player mark 53 is an image representing the position and the direction of the player character 51 on the map. The cursor 54 is an image for specifying a position in the virtual space on the map and is used to specify, for example, a position in which to set a marker object to be described later.

Figure 10:
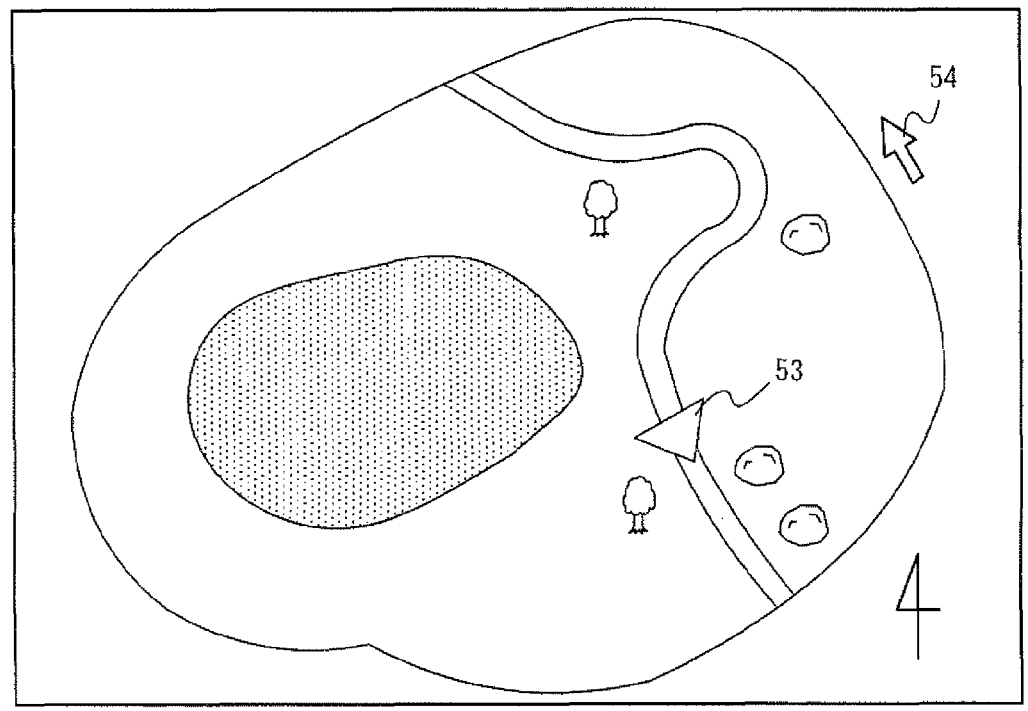
FIG. 10 is a diagram illustrating an exemplary fixed direction map.

When a predetermined map switching operation (e.g., an operation of pressing the button 32c numbered "2") is performed with the viewing direction map being displayed, the fixed direction map is displayed. FIG. 10 is a diagram illustrating an exemplary fixed direction map. Note that the fixed direction map shown in FIG. 10 corresponds to both the space image shown in FIG. 8 and the viewing direction map shown in FIG. 9. As shown in FIG. 10, the fixed direction map is a map in which a preset direction in the virtual space corresponds to a predetermined direction on the screen. In the present embodiment, the fixed direction map is displayed in which the directions of North, South, East and West are set in the virtual space and the direction of North corresponds to the upward direction on the screen. The fixed direction map is advantageous in that the overall design of the virtual space is readily comprehensible because a specific direction in the virtual space always corresponds to the upward direction on the screen (regardless of the viewing direction of the virtual camera) so that the map is always displayed in the same direction. Also, the fixed direction map represents a relatively wide range in the virtual space (when compared to the viewing direction map). Here, it is assumed that the game space is divided into a plurality of stages and the fixed direction map entirely represents one of the stages. Note that in the present embodiment, the fixed direction map has the player mark 53 and the cursor 54 displayed thereon as in the viewing direction map.

As described above, in the present embodiment, the game apparatus 3 displays two maps, i.e., the viewing direction map and the fixed direction map. By making it possible to display the two maps, it becomes possible to present maps representing the virtual space to the player in a comprehensible manner. Specifically, as for the viewing direction map, the correspondence between the virtual space and the map is readily comprehensible, and therefore, for example, the player can intuitively comprehend the positional relationship between the player character 51 and any surrounding object. Accordingly, for example, when it is desired to confirm surrounding conditions of the player character 51, the player is recommended to see the viewing direction map. On the other hand, as for the fixed direction map, the overall design of the virtual space (in this case, one entire stage) is readily comprehensible. Also, in the case of the fixed direction map, a specific direction (in this case, the direction of North) is always displayed as the upward direction, and therefore it is possible to readily comprehend directions in which the player character 51 comes and goes within the virtual space (when the player character 51 is moving). Accordingly, for example, when it is desired to move in a specific direction within the game space as in the case where "it is desired to go to a cave on the east side", the player is recommended to move while confirming the direction to be taken by the player character 51 with reference to the fixed direction map. In this manner, in the present embodiment, the player can view one of the two maps that is suitable for the conditions and the purpose, and therefore the game apparatus 3 can present a map to the player in a comprehensible manner.

Also, in the present embodiment, the viewing direction map is displayed first, and then the fixed direction map is displayed. The viewing direction map makes it possible to readily comprehend the correspondence between the virtual space and the map, and therefore by displaying the viewing direction map immediately after the space image is displayed, the game apparatus 3 allows the player to readily comprehend the correspondence between the virtual space and the map. Then, the game apparatus 3 displays the fixed direction map following the viewing direction map. Here, the fixed direction map has a disadvantage in that the correspondence between the virtual space and the map is hard to comprehend since the viewing direction in the virtual space does not match the direction in the map displayed on the screen. On the other hand, in the present embodiment, the viewing direction map is displayed before the fixed direction map, and therefore the player can comprehend the correspondence between the virtual space and the map through the viewing direction map before viewing the fixed direction map. Thus, upon viewing the fixed direction map, the player can be prevented from being confused by not comprehending the correspondence between the virtual space and the map. In this manner, in the present embodiment, the disadvantage of the fixed direction map can be offset by displaying the viewing direction map before the fixed direction map. Specifically, the present embodiment makes it possible to achieve more comprehensible map presentation by displaying two maps in an appropriate order.

Furthermore, in the present embodiment, the game apparatus 3 uses the viewing direction map as a narrow-area map and the fixed direction map as a wide-area map. One reason for this is that the viewing direction map is useful in viewing the surroundings of the player character 51 as described above and it is preferable to use the viewing direction map as a narrow-area map in order to clarify the surroundings of the player character 51. Another reason is that the fixed direction map is useful in comprehending the overall design of the virtual space and it is preferable to use the fixed direction map as a wide-area map so that a portion of the virtual space that is wide to some extent. In this manner, in the present embodiment, the viewing direction map and the fixed direction map are displayed to an extent suitable for their respective purposes, thereby displaying the maps in a more comprehensible manner.

Next, markers (a marker object and a marker image) to be set on the virtual space and the map will be described with reference to FIGS. 11 and 12. In the present embodiment, the player can set markers (a marker object and a marker image) on the virtual space or the map. For example, the markers are used for the player to remember desired positions in the virtual space. The player sets a marker in, for example, a position in which the player character 51 is caused to take some action (the game progresses by an event taking place as a result of a specific action taken by the player character 51 in that position) or at a destination of the player character 51.

Figure 11:
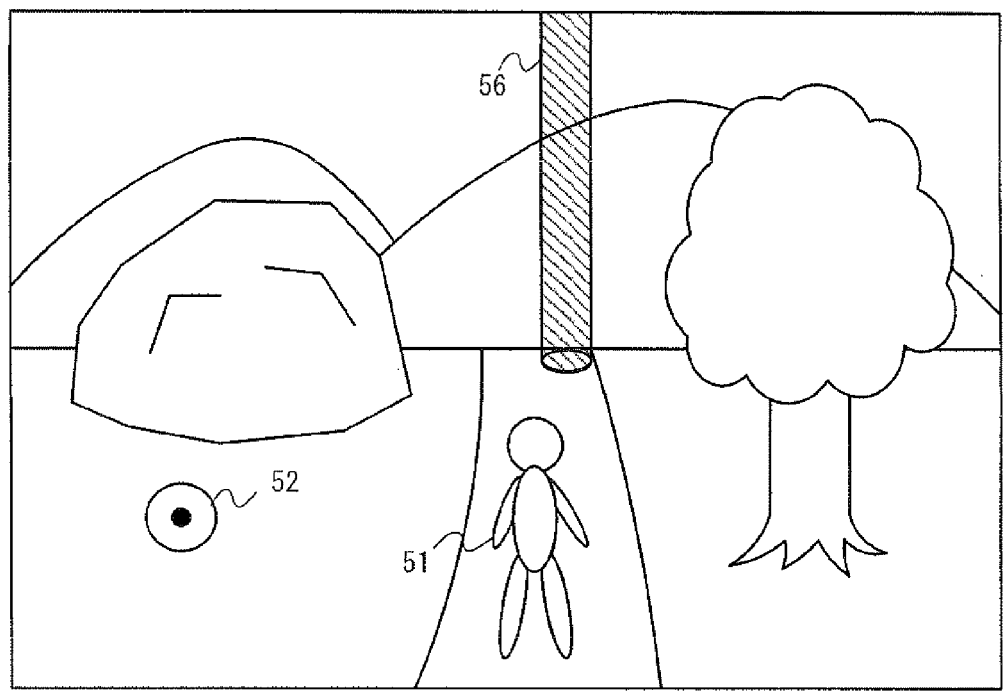
FIG. 11 is a diagram illustrating a space image where a marker object is set.
Figure 12:
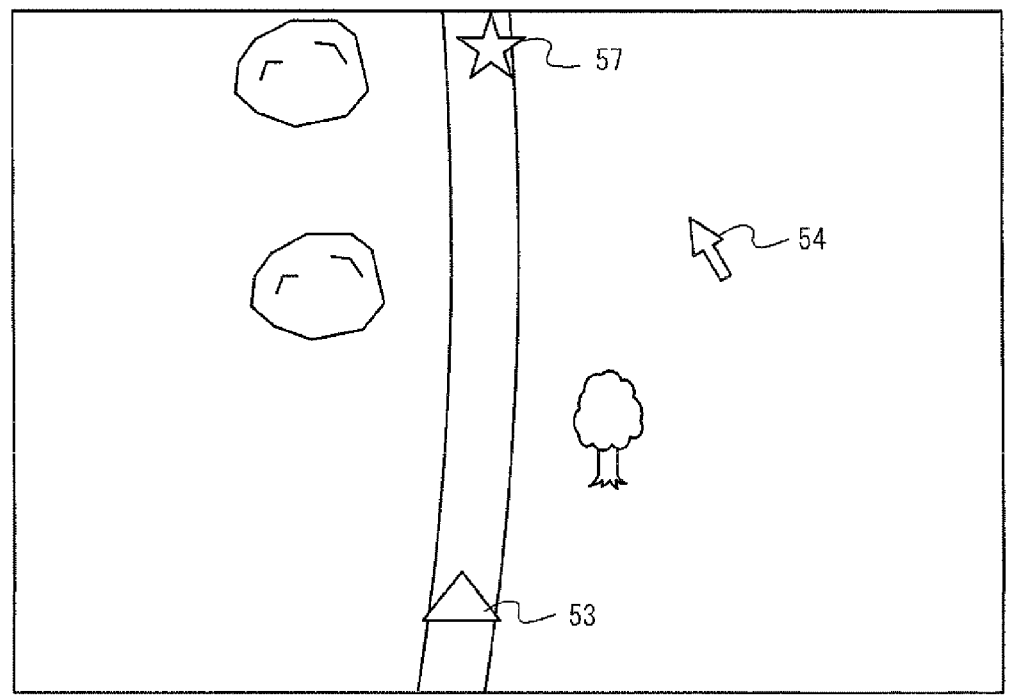
FIG. 12 is a diagram illustrating a viewing direction map where a marker is set.

FIG. 11 is a diagram illustrating a space image where a marker object is set. In FIG. 11, a marker object 56 is set in the virtual space and displayed in the space image. The marker object 56 is a three-dimensional object having a predetermined height. In the present embodiment, the predetermined height is set higher than other objects arranged in the virtual space (in FIG. 11, "mountain", "rock" and "tree" objects) such that the marker object 56 is displayed even when the virtual camera is positioned away therefrom. The marker object 56 can be set by the player when the space image is displayed. Specifically, the player moves the cursor 52 to a position in which the marker object 56 is desired to be set, and performs a predetermined marker setting operation (e.g., an operation of pressing the A button 32*d*). When this setting operation is performed, the game apparatus 3 sets the marker object 56 in the position pointed at by the cursor 52 within the virtual space.

Furthermore, when the marker object 56 is set in the virtual space, the marker is also reflected in maps (the viewing direction map and the fixed direction map). FIG. 12 is a diagram illustrating a viewing direction map where a marker is set. Note that the viewing direction map shown in FIG. 12 corresponds to the space image shown in FIG. 11. When the marker object 56 is set in the virtual space as shown in FIG. 12, the viewing direction map has a marker image 57 indicated in the position where the marker object 56 is set. While FIG. 11 shows the viewing direction map, the fixed direction map also has the marker image 57 indicated in the position where the marker object 56. In this manner, in the present embodiment, when the marker object 56 is set in the virtual space, the marker can be confirmed on the maps.

Furthermore, in the present embodiment, the player can set a marker on the map. Specifically, the player moves the cursor 54 to a position in which the marker image 57 is desired to be set, and performs a predetermined setting operation (e.g., an operation of pressing the A button 32*d*). When this setting operation is performed, the game apparatus 3 displays the marker image 57 in a position pointed at by the cursor 54 on the map. Also, in this case, the game apparatus 3 sets the marker object 56 in a position in the virtual space that corresponds to the position of the marker image 57 on the map. For example, when the marker image 57 is set on the viewing direction map shown in FIG. 12, the space image shown in FIG. 11 is displayed, i.e., the space image with the marker object 56 set in a position corresponding to the marker image 57 is displayed. In this manner, in the present embodiment, the marker object 56 can be set in the virtual space by setting the marker image 57 on the map.

[Details of the Game Process]

Figure 13:
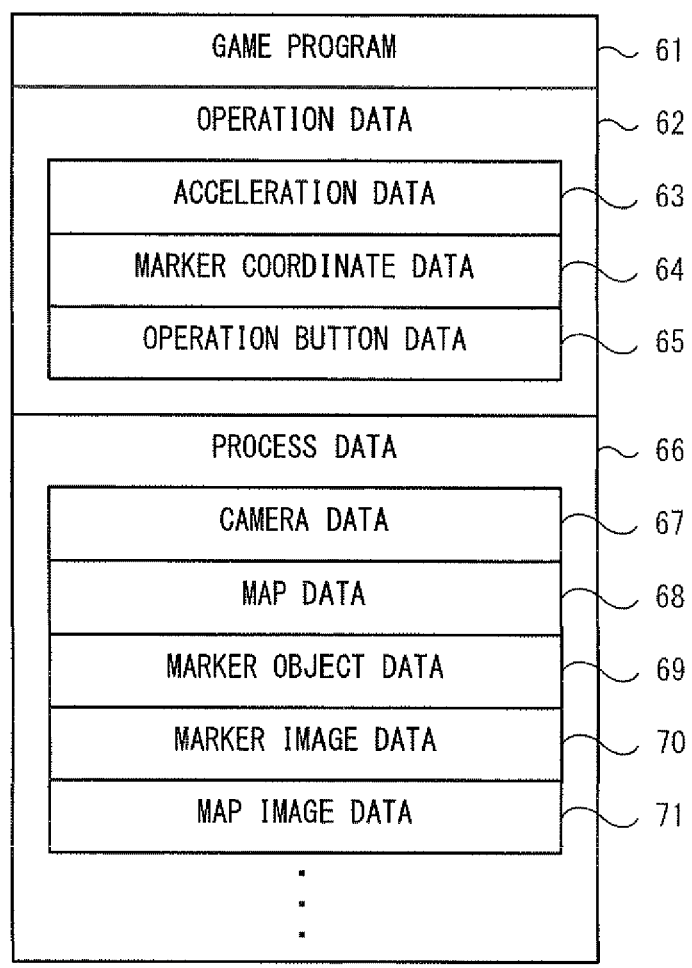
FIG. 13 is a diagram illustrating main data to be stored in a main memory of the game apparatus.

Next, the process performed by the game apparatus 3 will be described in detail. Firstly, main data used in the process performed by the game apparatus 3 will be described with reference to FIG. 13. FIG. 13 is a diagram illustrating main data to be stored in the main memory (the external main memory 12 or the internal main memory 11*e*) of the game apparatus 3. As shown in FIG. 13, a game program 61, operation data 62, and process data 66 are stored in the main memory of the game apparatus 3. In addition to the data shown in FIG. 13, data necessary for the game process, such as image data of various objects appearing in a game, data representing maps, data representing various parameters of the objects, and the like, are stored in the main memory.

Part or all of the game program 61 is read from the optical disc 4 and stored to the main memory at an appropriate time after the game apparatus 3 is powered on. The game program 61 includes a program for performing a predetermined game process using operation data from the controller 5 as a game input. Also, the game program 61 includes a program for performing processes for displaying the space image and the maps (the viewing direction map and the fixed direction map).

The operation data 62 is operation data transmitted from the controller 5 to the game apparatus 3. As described above, the operation data is transmitted from the controller 5 to the game apparatus 3 at intervals of ½₀₀ seconds, and therefore the operation data 62 stored in the main memory is updated at the same intervals. Note that a predetermined number of pieces of the operation data are sequentially stored to the main memory from the latest piece (the last acquired piece).

The operation data 62 includes acceleration data 63, marker coordinate data 64, and operation button data 65. The acceleration data 63 is data representing an acceleration (acceleration vector) detected by the acceleration sensor 37. The marker coordinate data 64 represents a coordinate point calculated by the image processing circuit 41 of the imaging information calculation section 35, that is, the data represents the marker coordinate point. The operation button data 65 is data representing an input state of each of the operation buttons 32*a* to 32*i*. Note that when another sensor device (e.g., a gyroscope) is connected to the controller 5 via the connector 33, the operation data may include data representing a detection result by the sensor device (e.g., an angular rate detected by a gyroscope).

The process data 66 is data used for a game process (FIG. 14) described below. The process data 66 includes camera data 67, map data 68, marker object data 69, marker image data 70, and map image data 71. The process data 66 includes various data (e.g., data representing a game parameter) used for the game process, in addition to the data shown in FIG. 13.

The camera data 67 is data representing the position and the orientation of the virtual camera within the virtual space. Note that in the present embodiment, the position and the orientation of the virtual camera are controlled in accordance with the position and the direction of the player character 51.

The map data 68 is data indicating that either the viewing direction map or the fixed direction map is to be displayed. Specifically, the map data 68 may be data specifying either the viewing direction map or the fixed direction map or may be flag data indicating ON or OFF (where ON corresponds to the viewing direction map and OFF corresponds to the fixed direction map).

The marker object data 69 is data indicating a position in which to set the marker object 56 within the virtual space. Note that in the present embodiment, the marker object 56 can be set in plurality. When a plurality of marker objects 56 are set, the marker object data 69 indicates the position of each marker object 56.

The marker image data 70 is data indicating a position in which to display the marker image 57 on the map. The position on the map that is indicated by the marker image data 70 corresponds to the position in the virtual space that is indicated by the marker object data 69. Note that when a plurality of marker images 57 are set, the marker image data 70 indicates the position of each marker image 57.

The map image data 71 is data representing images of the viewing direction map and the fixed direction map. In the present embodiment, the viewing direction map and the fixed direction map are generated using the same image data. Specifically, there is only one map image representing a single stage; when the fixed direction map is displayed, the image is displayed without modification, and when the viewing direction map is displayed, the image is displayed after being subjected to processing such as rotation or enlargement.

Figure 14:
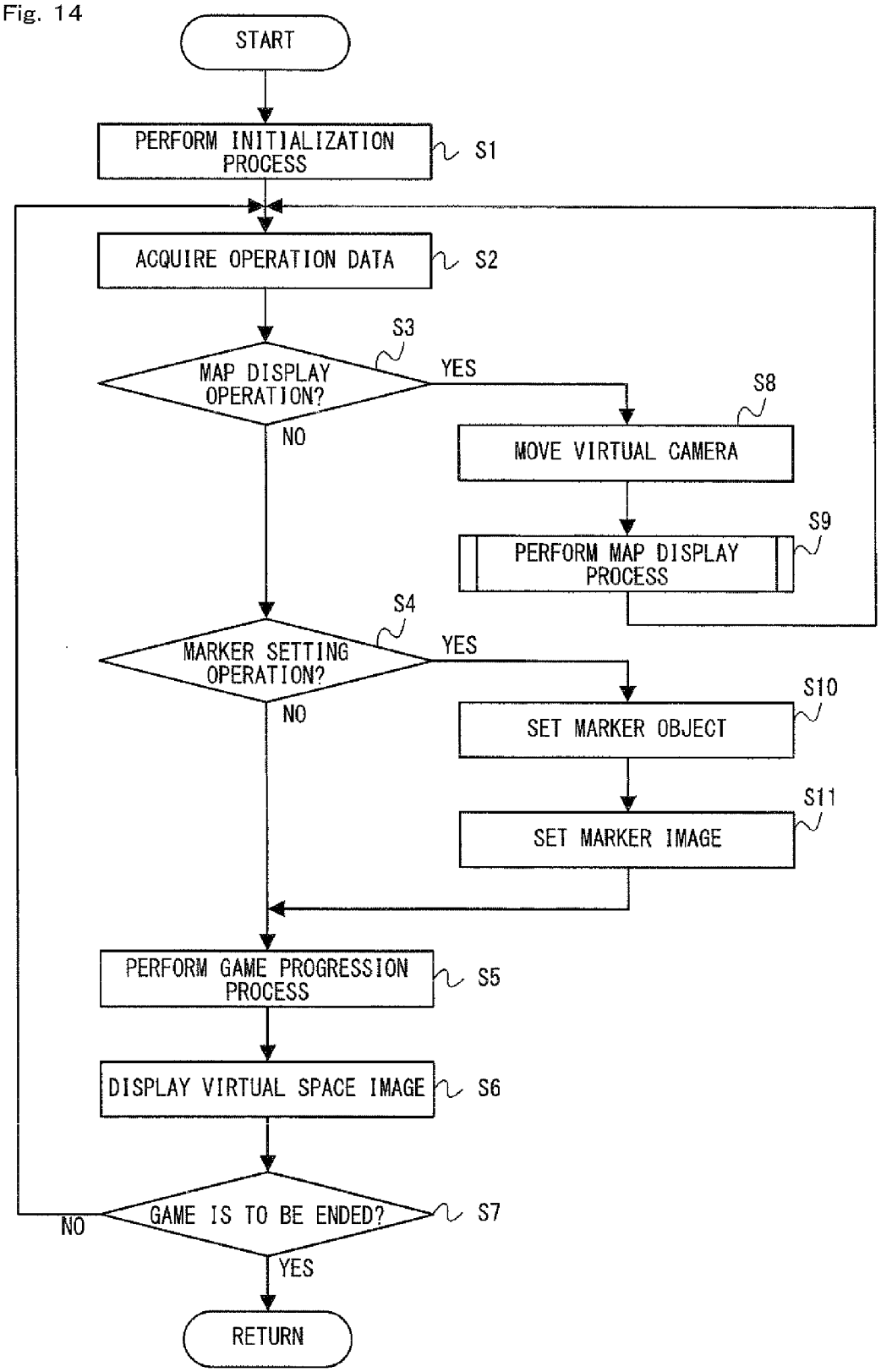
FIG. 14 is a main flow chart showing a flow of a process performed by the game apparatus.

Next, the process performed by the game apparatus 3 will be described in detail with reference to FIGS. 14 to 17. FIG. 14 is a main flow chart showing a flow of the process performed by the game apparatus 3. When the game apparatus 3 is powered on, the CPU 10 of the game apparatus 3 executes a boot program stored in a boot ROM not shown, so as to initialize each unit, including the main memory. The game program stored in the optical disc 4 is loaded to the main memory, and the CPU 10 starts executing the game program. The flow chart of FIG. 14 illustrates a process performed when the processes described above are completed.

In step S1 shown in FIG. 14, the CPU 10 performs an initialization process. The initialization process is a process in which a virtual space is constructed, objects appearing in the virtual space are arranged in their initial positions, initial values of various parameters to be used in the game process are set. Note that the marker object and the marker image are assumed here to not be set at the beginning of the game (step S1). However, for example, when the game apparatus 3 reads save data to continue the game from the last save point, the save data may include the marker object data 69 and the marker image data 70 such that previous marker objects and marker images are set in step S1 as they were last saved. Following step S1, the process of step S2 is performed.

In step S2, the CPU 10 acquires operation data. Specifically, the operation data transmitted from the input device 8 is received via the wireless controller module 19, and therefore the CPU 10 stores the received operation data to the main memory. Following step S2, the process of step S3 is performed.

In step S3, the CPU 10 determines whether or not the player has performed a map display operation. The map display operation is an operation to display a map in place of a space image, e.g., an operation of pressing the button 32*b* numbered "1" on the controller 5. The CPU 10 reads the operation button data 65 from the main memory to determine whether or not the button 32*b* numbered "1" has been pressed with reference to the operation button data 65. When the determination result of step S3 is affirmative, the processes of steps S8 and S9 to be described later are performed. On the other hand, when the determination result of step S3 is negative, the process of step S4 is performed.

In step S4, the CPU 10 determines whether or not the player has performed a marker setting operation. The marker setting operation is an operation to set markers (the marker object 56 and the marker image 57), e.g., an operation of pressing the A button 32*d* of the controller 5. The CPU 10 reads the operation button data 65 from the main memory to determine whether or not the A button 32*d* has been pressed with reference to the operation button data 65. When the determination result of step S4 is affirmative, the processes of steps S10 and S11 to be described later are performed. On the other hand, when the determination result of step S4 is negative, the process of step S5 is performed.

In step S5, the CPU 10 performs a game progression process to progress the game. The game progression process includes, for example, a process for controlling the action of the player character 51 in accordance with an input to the controller 5, a process for controlling another object (e.g., an enemy object) in accordance with predetermined control rules, and a process for controlling the position and the orientation of the virtual camera. Here, the position and the orientation of the virtual camera are set at least based on the position and the direction of the player character. That is, in the present embodiment, the virtual camera is positioned in accordance with the user's operation. Specifically, the position and the orientation (viewing direction) of the virtual camera are controlled such that the virtual camera is positioned behind the player character 51 while being directed forward from the player character 51. Data indicating the position and the orientation of the virtual camera is stored to the main memory as camera data 67.

Also, in the present embodiment, the game progression process includes a process for calculating the position of the cursor 52 displayed on the screen based on an input to the controller 5. The position of the cursor 52 may be controlled with, for example, the cross button 32*a* of the controller 5 or may be calculated from the orientation or the controller 5 or a position on the screen that is pointed at by the controller 5 (the Z-axis of the controller 5). Note that the orientation of the controller 5 and the position on the screen that is pointed at by the controller 5 may be calculated based on the acceleration data 63 and/or the marker coordinate data 64 or may be calculated based on angular rate data if the operation data includes data indicating an angular rate detected by the gyroscope. By the process of step S5, the action of objects appearing in the game space, including the player character 51, is controlled while the game progresses. Following step S5, the process of step S6 is performed.

In step S6, the CPU 10 displays an image of a virtual space (a space image) on the screen of the television 2. Specifically, the CPU 10 reads camera data 67 from the main memory to identify the position and the orientation of the virtual camera and generates an image of the virtual space, as viewed in the viewing direction of the virtual camera, based on the position of the virtual camera. Then, the generated image is displayed on the screen. As a result, for example, the space image as shown in FIG. 8 is displayed. Furthermore, in the present embodiment, the cursor 52 is displayed along with the space image. The position in which to display the cursor 52 has already been calculated in step S5. Following step S6, the process of step S7 is processed.

In step S7, the CPU 10 determines whether or not to end the game. The determination of step S7 is made based on, for example, whether or not the game has been cleared, the game is over, or the player has given an instruction to stop the game. When the determination result of step S7 is negative, the process of step S2 is performed again. On the other hand, when the determination result of step S7 is affirmative, the CPU 10 ends the game process shown in FIG. 14.

As shown above in steps S2 to S7, when the map display operation is not performed (No in step S3), the processes of steps S2 to S7 are repeatedly performed. As a result, the space image representing a game space is displayed.

Next, a process to be performed when the map display operation is performed will be described. When the player has performed the map display operation, the determination result of step S3 is affirmative, so that the processes of steps S8 and S9 are performed. The processes of steps S8 and S9 will be described in detail below.

Figure 15:
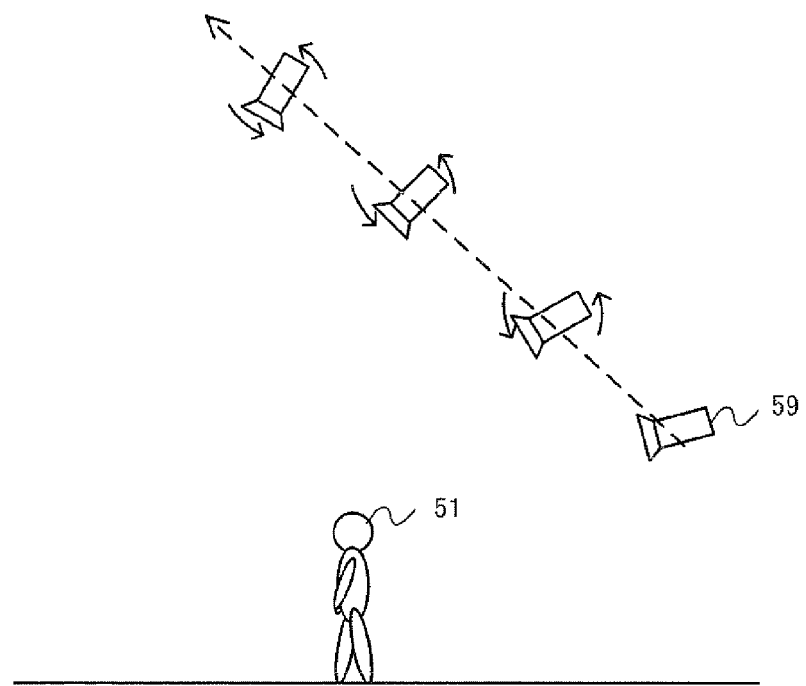
FIG. 15 is a diagram illustrating motion of a virtual camera in accordance with the process of step S8.

In step S8, the CPU 10 performs a process for changing the position and the orientation of the virtual camera. FIG. 15 is a diagram illustrating the motion of the virtual camera in accordance with the process of step S8. Before the process of step S8 is performed, the virtual camera 59 is positioned behind and toward the player character 51, as shown in FIG. 15. Here, in the process of step S8, the virtual camera 59 is controlled to rotate while moving upward, such that the viewing direction corresponds to a vertically downward direction in the virtual space (see arrows shown in FIG. 15). Furthermore, in the present embodiment, the virtual camera 59 moves forward from the player character 51 while moving upward (see arrows shown in FIG. 15). Note that the virtual camera 59 does not rotate about the viewing direction. By the process of step S8, the virtual camera 59 moves until it is directed in a predetermined viewing direction (e.g., a vertically downward direction), and therefore the process end when the virtual camera 59 is directed in that predetermined viewing direction. Also, the process of moving the virtual camera 59 is performed over a plurality of frames. As a result, images (video) are displayed on the screen of the television 2 with the viewpoint on the virtual space being gradually directed downward while moving upward.

Figure 16:
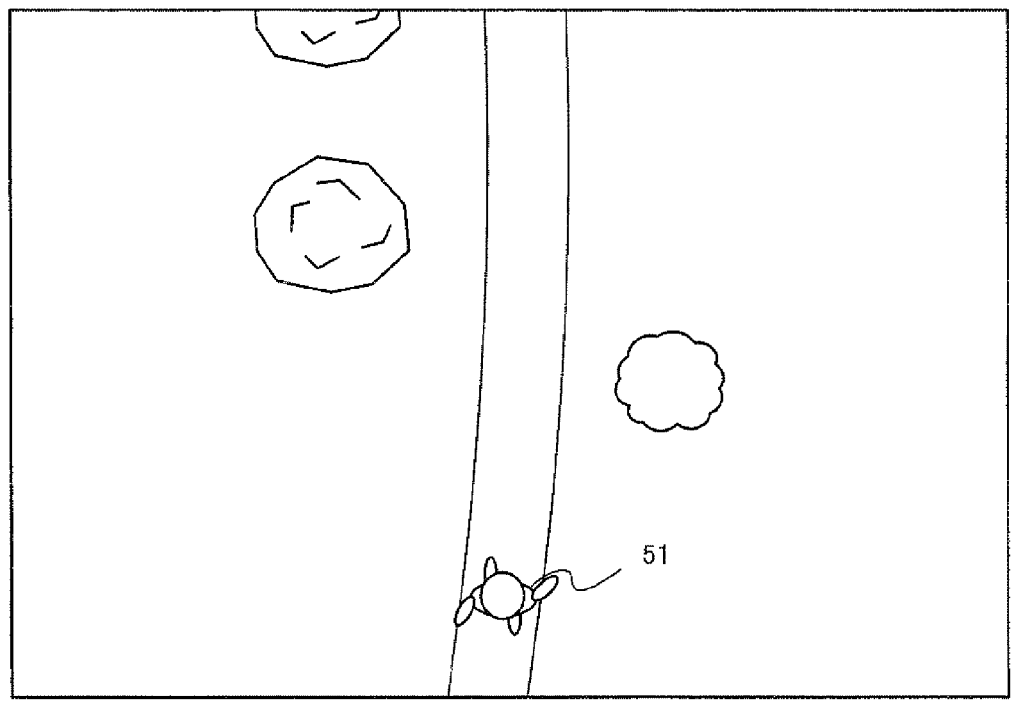
FIG. 16 is a diagram illustrating a space image after the virtual camera was moved by the process of step S8.

FIG. 16 is a diagram illustrating the space image after the virtual camera was moved by the process of step S8. By the process of step S8, an image of the virtual space as viewed from above is displayed, as shown in FIG. 16. Also, in the space image after the process of step S8, the viewing direction before the process of step S8 changes to correspond to the upward direction on the screen. Following step S8, the process of step S9 is performed.

As a result of the above, in the present embodiment, when the map display operation is performed with a space image displayed (Yes in step S3), an image is displayed with the viewpoint being directed downward while moving upward (step S8). Specifically, by the process of step S8, the line of sight in the space image changes such that the virtual space is viewed from above, and the displayed space image changes such that the virtual space is viewed with the same line of sight as in the case of the maps (with the vertically downward line of sight). Also, as a result of this change, the viewing direction before the process of step S8 changes to correspond to the upward direction on the screen. Furthermore, as will be described in detail later, by the process of step S9 following step S8, the viewing direction map is displayed. Accordingly, in the present embodiment, when the map display operation is performed, the image displayed on the screen is switched to the viewing direction map (FIG. 9) after changing from the space image in a normal viewing direction (FIG. 8) to the space image in the same viewing direction as in the case of the maps (FIG. 16). As a result, the player can intuitively comprehend the correspondence between the virtual space and the map when the display changes from the space image to the map image. Also, in the present embodiment, the virtual camera 59 rotates downward while moving forward from the player character 51. As a result, the position of the player character 51 in the image of the virtual space obtained by the moved virtual camera 59 matches the position of the player mark 53 on the viewing direction map. For example, the position of the player character 51 in the space image shown in FIG. 16 matches the position of the player mark 53 on the viewing direction map shown in FIG. 9. Thus, the player can more readily comprehend the correspondence between the virtual space and the map.

Note that in the present embodiment, the CPU 10 controls the viewing direction of the virtual camera to face downward in the virtual space while moving the virtual camera obliquely upward (i.e., the camera being raised while moving forward). Here, in another embodiment, the CPU 10 may simply change the viewing direction of the virtual camera to face downward in the virtual space, and the position of the virtual camera does not have to be moved. Also, even in the case of moving the position of the virtual camera, the CPU 10 may move the virtual camera vertically rather than obliquely upward.

Returning to the description of FIG. 14, in step S9, the CPU 10 performs a map display process. The map display process is a process for displaying the viewing direction map or the fixed direction map on the screen of the television 2. The map display process will be described in detail below with reference to FIG. 17.

Figure 17:
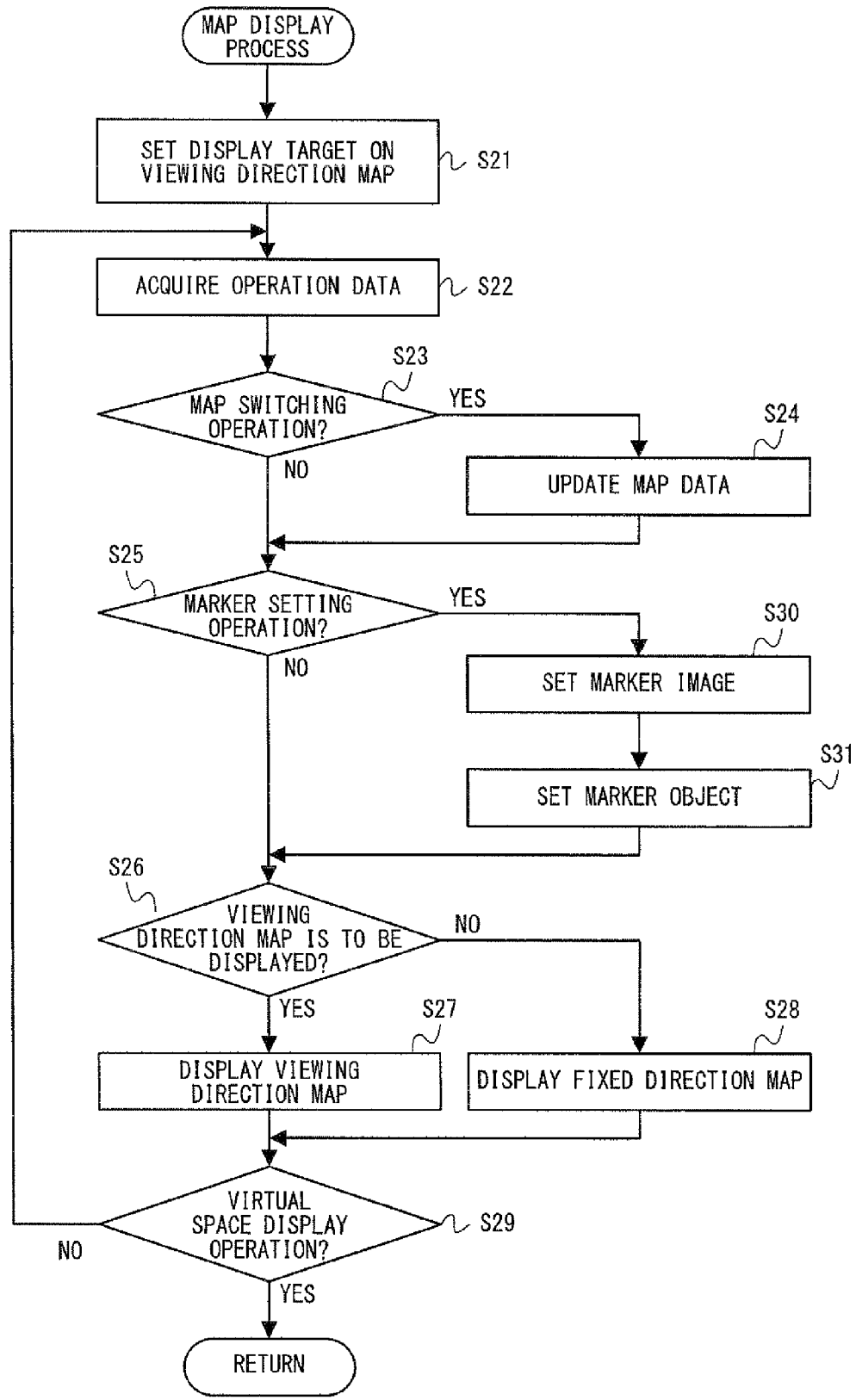
FIG. 17 is a flow chart illustrating a flow of a map display process (step S9) shown in FIG. 14.

FIG. 17 is a flow chart illustrating a flow of the map display process (step S9) shown in FIG. 14. In the map display process, first in step S21, the CPU 10 sets a target to be displayed on the screen on the viewing direction map. Specifically, data representing the viewing direction map is stored to the main memory as map data 68. As will be described in detail later, in a display process (steps S26 to S28) to be described later, the map represented by the map data 68, either the viewing direction map or the fixed direction map, is displayed on the screen. Accordingly, in the present embodiment, when the map display operation is performed through the process of step S21, the viewing direction map is initially displayed in place of the space image. That is, the process of step S21 is a process for displaying the viewing direction map (rather than the fixed direction map) after the space image. Following step S21, the process of step S22 is performed.

In step S22, the CPU 10 acquires operation data. The process of step S22 is the same as the process of step S2. Following step S22, the process of step S23 is performed.

In step S23, the CPU 10 determines whether or not the player has performed a map switching operation. The map switching operation is an operation for switching maps to be displayed between the viewing direction map and the fixed direction map, e.g., an operation of pressing the button 32c numbered "2" of the controller 5. The CPU 10 reads operation button data 65 from the main memory and determines whether or not the button 32c numbered "2" has been pressed with reference to the operation button data 65. When the determination result of step S23 is affirmative, the process of step S24 is performed. On the other hand, when the determination result of step S23 is negative, the process of step S24 is skipped and the process of step S25 is performed.

In step S24, the CPU 10 updates map data 68 stored in the main memory. Specifically, when the map data before update represents the viewing direction map, the map data is updated so as to represent the fixed direction map. Also, when the map data before update represents the fixed direction map, the map data is updated so as to represent the viewing direction map. That is, the CPU 10 updates the map data 68 so as to represent a different map from that represented before update. By the process of step S24, maps to be displayed in the display process (steps S26 to S28) to be described later are switched. Following step S24, the process of step S25 is performed.

In step S25, the CPU 10 determines whether or not the player has performed a marker setting operation. Note that in the present embodiment, an input operation for the marker setting operation is the same for both the case where the space image is being displayed and the case where the map is being displayed (i.e. the operation being to press the A button 32d). Accordingly, the process of step S25 is the same as that of step S4. However, in another embodiment, the input operation for the marker setting operation may vary between the case where the space image is being displayed and the case where the map is being displayed. When the determination result of step S25 is affirmative, the processes of steps S30 and S31 to be described later are performed. On the other hand, when the determination result of step S25 is negative, the processes of steps S30 and S31 are skipped and the process of step S26 is performed.

In step S26, the CPU 10 determines whether or not to display the viewing direction map. Specifically, the CPU 10 reads the map data 68 from the main memory to determine whether or not the map data 68 represents the viewing direction map. When the determination result of step S26 is affirmative, the process of step S27 is performed. On the other hand, when the determination result of step S26 is negative, the process of step S28 is performed.

In step S27, the CPU 10 displays the viewing direction map on the screen of the television 2. Specifically, the CPU 10 reads map image data 71 from the main memory and displays a map image rotated with the viewing direction of the virtual camera in the virtual space corresponding to the upward direction on the screen. Also, in the present embodiment, a portion of the entire map that represents a region around the player character 51 is displayed. Specifically, the displayed region of the map image is set such that the player character 51 is positioned at the center of that region (or slightly below the center). Also, the size of the displayed region of the map image is predetermined to be narrower than a region displayed as the fixed direction map to be described later. Accordingly, the CPU 10 displays the map image represented by the map image data 71 on a predetermined scale. As described above, in step S27, a prepared map image is subjected to processing such as rotation, thereby generating an image of the viewing direction map.

Also, in step S27, the player mark 53 and the cursor 54 are superimposed on the displayed image of the viewing direction map. The player mark 53 is displayed in a position corresponding to the position of the player character 51 in the virtual space. The position in which to display the cursor 54 may be determined such that the cursor 54 moves in accordance with the player's input operation, and, for example, the position of the cursor 54 is calculated in the same manner as the position of the cursor 52 displayed on the space image. Furthermore, when the marker image 57 is set, the marker image 57 is superimposed on the displayed image of the viewing direction map. As will be described in detail later, the position in which to display the marker image 57 is indicated by the marker image data 70. Following step S27, the process of step S29 is performed.

On the other hand, in step S28, the CPU 10 displays the fixed direction map on the screen of the television 2. Specifically, the CPU 10 reads the map image data 71 from the main memory and displays a map image with a given predetermined direction (in the present embodiment, the direction of North) corresponding to the upward direction on the screen. Also, in the present embodiment, an entire map image for one stage is displayed as the fixed direction map. Note that in step S28, as in step S27, the player mark 53, the cursor 54, and, as necessary, the marker image 57 are superimposed on the displayed image of the fixed direction map. Following step S28, the process of step S29 is performed.

Note that in steps S27 and S28, each map is displayed in a screen area where the space image is displayed (in the present embodiment, the entire screen of the television 2). That is, the space image is deleted when the map image is displayed. Note that in another embodiment, in steps S27 and S28, the CPU 10 may display the space image on a part of the screen while displaying the map image.

According to steps S27 and S28, the viewing direction map and the fixed direction map are generated using the same image data. Specifically, the CPU 10 has map image data 71, which represents an entire map, prepared (stored) in the main memory, such that the viewing direction map is displayed with the image subjected to processing such as rotation and/or enlargement and the image is displayed as the fixed direction map without modification. In this manner, by using one type of image data to generate both the viewing direction map and the fixed direction map, the amount of image data to be prepared can be reduced. Also, in the case where one type of image data is used to generate both the viewing direction map and the fixed direction map, it is possible to seamlessly change the maps when switching between the viewing direction map and the fixed direction map, as in a variant to be described later. Note that, in another embodiment, the viewing direction map and the fixed direction map may be generated from their respective different pieces of map image data.

In step S29, the CPU 10 determines whether or not the player has performed a virtual space display operation. The virtual space display operation is an operation for displaying a space image in place of the map image, e.g., an operation of pressing the button 32*b* numbered "1" of the controller 5. The CPU 10 reads operation button data 65 from the main memory and determines whether or not the button 32*b* numbered "1" has been pressed with reference to the operation button data 65. When the determination result of step S29 is negative, the process of step S22 is performed again. Thereafter, until the map display process is determined to be ended in step S29, the process of steps S22 to S29 (and as necessary the processes of steps S30 and S31) are repeatedly performed. On the other hand, when the determination result of step S29 is affirmative, the CPU 10 ends the map display process. After the map display process is ended, the process of step S2 is performed again, so that the space image is displayed.

As described above, according to the map display process, the viewing direction map is initially displayed in response to the map display operation being performed with the space image displayed (steps S21 and S27). Thereafter, in response to the map switching operation being performed when the viewing direction map is displayed (Yes in step S23), the fixed direction map is displayed (steps S24 and S28). That is, according to the map display process, the viewing direction map is displayed first after the space image, thereby allowing the player to readily comprehend the correspondence between the virtual space and the map, and thereafter the fixed direction map is displayed. Thus, according to the map display process, the viewing direction map is displayed before the fixed direction map, thereby offsetting the disadvantage of the fixed direction map, i.e., "incomprehensible correspondence between the virtual space and the map", and therefore it is possible to present maps to the player in a more comprehensible manner.

Also, according to the map display process, in response to the map switching operation being performed when the fixed direction map is being displayed (Yes in step S23), the viewing direction map is displayed (steps S24 and S27). Also, in response to the virtual space display operation being performed when the fixed direction map is being displayed (Yes in step S29), the space image is displayed (step S6). Thus, according to the map display process, it is possible to make a switch from the fixed direction map to the viewing direction map or the space image, and therefore the player can readily switch images to be displayed.

Also, according to the map display process, the display can be alternatingly switched between the viewing direction map and the fixed direction map, and therefore it is possible to present maps to the player in a more comprehensible manner. Furthermore, according to the map display process, even in the case either the viewing direction map or the fixed direction map is being displayed, if the virtual space display operation is performed (Yes in step S29), the space image is displayed (step S6). Thus, when either the viewing direction map or the fixed direction map is displayed, the player can change the display to the space image with a single operation, and therefore the player can readily make a switch between the map and the space image.

In the map display process, although not described above, the displayed viewing direction map or fixed direction map may be subjected to operations such as rotation, enlargement, reduction, and moving (scrolling). Specifically, for example, the CPU 10 may rotate, enlarge, reduce, or move a map image displayed on the screen in accordance with an input with the controller 5.

Next, a process to be carried out when the marker setting operation is performed will be described. When the player performs a marker setting operation with the space image being displayed, the determination result of step S4 shown in FIG. 14 is affirmative, so that the processes of steps S10 and S11 are performed.

In step S10, the CPU 10 sets a marker object 56. Specifically, the CPU 10 calculates a position in the virtual space that is pointed at by the cursor 52, and stores data indicating the calculated position to the main memory as marker object data 69. Note that the position in which to display the cursor 52 can be calculated in the same manner as in step S5. Following step S10, the process of step S11 is performed.

In step S11, the CPU 10 sets a marker image 57. Specifically, the CPU 10 reads the marker object data 69 stored in step S10 and calculates a position on the map that corresponds to the position indicated by the marker object data 69. Data indicating the calculated position (on the map) is stored to the main memory as marker image data 70. Following step S11, the process of step S5 is performed.

Note that in another embodiment, the game apparatus 3 may delete the marker object 56 being set. For example, when a predetermined deletion operation is performed with the cursor 52 pointing at a marker object 56, the CPU 10 deletes the marker object data 69 that represents the marker object 56 pointed at by the cursor 52 from the main memory. Furthermore, the CPU 10 also deletes marker image data 70 that corresponds to the deleted marker object data 69 from the main memory. As a result, the player can delete markers in the virtual space independently of each other.

On the other hand, when the player performs a marker setting operation with the map being displayed, the determination result of step S25 shown in FIG. 17 is affirmative, so that the processes of steps S30 and S31 are performed.

In step S30, the CPU 10 sets a marker image 57. Specifically, the CPU 10 calculates a position on the map that is pointed at by the cursor 54 and stores data indicating the calculated position to the main memory as marker image data 70. Note that the position in which to display the cursor 54 can be calculated in the same manner as in steps S27 and S28. Following step S30, the process of step S31 is performed.

In step S31, the CPU 10 sets a marker object 56. Specifically, the CPU 10 reads the marker image data 70 stored in step S30 and calculate a position in the virtual space that corresponds to the position indicated by the marker image data 70. Data indicating the calculated position (in the virtual space) is stored to the main memory as marker object data 69. Following step S31, the process of step S26 is performed.

Note that in another embodiment, the game apparatus 3 may be able to delete any marker images 57 being set. For example, when a predetermined deletion operation is performed with the cursor 54 pointing at a marker image 57, the CPU 10 deletes marker image data 70 that represents the marker image 57 pointed at by the cursor 54 from the main memory. Furthermore, the CPU 10 deletes marker object data 69 that corresponds to the deleted marker image data 70 from the main memory. As a result, the player can delete markers on the map independently of each other.

When the marker object data 69 is stored through the process of step S10 or S31, in step S5 to be performed thereafter, the CPU 10 reads the marker object data 69 from the main memory and sets a marker object 56 in a position indicated by the marker object data 69. As a result, in step S6, a space image is displayed with the marker object 56 (FIG. 11). Note that the marker object 56 is preferably transparent or translucent so that the player can visually perceive another object positioned therebeneath. Also, when a plurality of marker objects 56 are arranged, the marker objects 56 preferably differ in color and/or shape from each other.

Also, in the present embodiment, the height of the marker object 56 is predetermined, but in another embodiment, the CPU 10 may change the height of the marker object 56 in accordance with its surroundings and the type of the game space. For example, the CPU 10 may set the height of the marker object 56 such that the marker object 56 is higher than any object positioned within a predetermined distance therefrom. Also, for example, the CPU 10 may set the height of the marker object 56 for each stage of the game space. Specifically, in a stage with a high object such as a mountain, the marker object 56 may be set to be relatively high, and in a stage without any high object, such as a stage with a field of grass, the marker object 56 may be set to be relatively low.

Also, when the marker image data 70 is stored through the process of step S11 or S30, in step S27 or S28 to be performed thereafter, the CPU 10 reads the marker image data 70 from the main memory and displays a marker image 57 in a position indicated by the marker image data 70. As a result, the marker image 57 is displayed on the map (FIG. 12). Note that when a plurality of marker images 57 are set, the marker images 57 preferably differ in color and shape from each other, as in the case of the marker objects 56.

Note that in the present embodiment, the player can set the marker image 57 in both cases where the viewing direction map is displayed and where the fixed direction map is displayed, but in another embodiment, the game apparatus 3 may be such that the player can set the marker image 57 only in either of the cases mentioned above. For example, when the fixed direction map, which represents a wide area, is displayed, any operation is conceivably difficult to perform, and therefore the game apparatus 3 may accept no marker setting operation, so that the game apparatus 3 may accept the marker setting operation only when the viewing direction map, which represents a narrow area, is displayed.

As described above, according to the game process shown in FIG. 14, the game apparatus 3 is capable of displaying two maps representing a virtual space, i.e., the viewing direction map and the fixed direction map. In this manner, by making it possible to display the two maps, it becomes possible to present maps representing the virtual space to the player in a comprehensible manner.

[Variants]

(Variant for Use with Virtual Spaces Other than the Game Space)

By taking the game apparatus 3 and the game program 61 as examples of the information processing device and the information processing program, respectively, according to the present invention, the above embodiment has been described with respect to exemplary cases where game spaces are represented by maps as exemplary virtual spaces. Here, the present invention is applicable to cases where maps are displayed to represent not only game spaces but also any arbitrary virtual spaces. The present invention is also applicable to navigation devices for displaying, for example, both three-dimensional virtual space maps and two-dimensional planar maps.

(Variant on Conditions for Displaying Maps)

In the above embodiment, maps (the viewing direction map and the fixed direction map) are displayed in response to the player's instructions, but in another embodiment, maps may be displayed in response to predetermined conditions being satisfied. For example, the CPU 10 may display a map in response to the player character 51 acquiring (or using) a predetermined item or the player character 51 moving to a specific position in the virtual space.

Also, in the above embodiment, the viewing direction map is displayed in response to the player's instruction being given when the space image is being displayed, and the fixed direction map is displayed in response to the player's instruction being given when the viewing direction map is being displayed. Here, in another embodiment, the viewing direction map may be displayed in response to the player's instruction being given when the space image is being displayed, and the fixed direction map may be displayed subsequently after a lapse of a predetermined time period. That is, when displaying the fixed direction map, the game apparatus 3 may display the viewing direction map for the predetermined time period before the fixed direction map. Also, in this case, the game apparatus 3 may continuously display the viewing direction map in response to an instruction different from an instruction to display the fixed direction map.

(Variant on Switching from the Space Image to the Viewing Direction Map)

In the above embodiment, when the screen is switched from the space image to the viewing direction map, the virtual camera 59 is controlled to move upward while rotating such that its viewing direction corresponds to the vertically downward direction in the virtual space (see FIG. 15). Here, in another embodiment, when the above switching occurs, the CPU 10 may display the virtual space image taken by the virtual camera 59 with the image of the viewing direction map superimposed thereon, while moving (or instead of moving) the virtual camera 59 in a manner as described above. Specifically, the CPU 10 may display the virtual space image so as to gradually fade over time and may display the viewing direction map so as to gradually become sharp over time. As a result, when the display is switched from the space image to the map image, the user can more clearly comprehend the correspondence between the virtual space and the map. Note that the superimposition of the viewing direction map image on the virtual space image may be started at any time. For example, the superimposition may be started after a predetermined time period since the map display operation or it may be started when the virtual camera 59 reaches a predetermined position.

Furthermore, when the super position display is provided, the viewing direction map image preferably changes in scale in accordance with the virtual space image. Specifically, while the viewing direction map image is superimposed on the virtual space image, the range represented by the virtual space image taken by the virtual camera 59 preferably matches the range represented by the viewing direction map. For example, when the range represented by the virtual space image is smaller than the range represented by the viewing direction map, the CPU 10 may display the viewing direction map image while gradually reducing the scale thereof in response to the area represented by the virtual space image becoming wider as the virtual camera 59 moves. As a result, more accurate correspondence can be established between the virtual space image and the viewing direction map image, making it possible to present the correspondence between the virtual space and the map to the user in a more comprehensible manner.

Also, when the superimposition display is provided, the CPU 31 may move the display range of the viewing direction map in accordance with the position of the virtual camera 59. Specifically, the display range of the viewing direction map may be moved such that, while the superimposition display is provided, the position of the virtual camera 59 on the viewing direction map is fixed in a predetermined position within the display range of the viewing direction map. As a result, more accurate correspondence can be established between the virtual space image and the viewing direction map image, making it possible to present the correspondence between the virtual space and the map to the user in a more comprehensible manner.

Note that any image compositing (superimposing) method may be employed to provide the superimposition display, and for example, the method may use α values (transparency). Specifically, the CPU 10 may provided the superimposition display by gradually changing the α value of the virtual space image from 1 to 0 while gradually changing the α value of the viewing direction map image from 0 to 1 (note that the sum of their α values equals 1).

(Variant on Switching from the Viewing Direction Map to the Fixed Direction Map)

In the above embodiment, when switching the display between the viewing direction map and the fixed direction map, the display is quickly changed from one map to the other. Here, in another embodiment, when the above switching occurs, the game apparatus 3 may display the maps such that one map seamlessly changes to the other. Specifically, in the above embodiment, when the viewing direction map is switched to the fixed direction map (when the map data 68 is updated), the CPU 10 gradually rotates the displayed viewing direction map while reducing the scale thereof. More specifically, for each frame, the CPU 10 rotates the viewing direction map by a predetermined angle while reducing the scale thereof by a predetermined rate. By rotating the viewing direction map while reducing the scale thereof as described above, the fixed direction map is finally displayed. That is, the fixed direction map is displayed after the rotation and reduction of the viewing direction map. As a result, the viewing direction map is seamlessly changed to the fixed direction map. Thus, the correspondence between the viewing direction map and the fixed direction map can be presented to the player in a more comprehensible manner. Note that when the display is switched from the fixed direction map to the viewing direction map, the CPU 10 may seamlessly change the fixed direction map to the viewing direction map by rotating the fixed direction map by a predetermined angle for each frame while increasing the scale thereof by a predetermined rate. Also, in another embodiment, when the display is switched from one map to the other, one map may be simply rotated (without increasing/reducing the scale thereof) before displaying the other map.

(Variant on the Order of Displaying the Maps)

In the above embodiment, when the display is switched from the space image to the map, the game apparatus 3 first displays the viewing direction map (step S21). Here, in another embodiment, when the display is switched from the space image to the map, the game apparatus 3 may first display the same map as that displayed before the space image (i.e., the last displayed map). Specifically, in the map display process, the CPU 10 may skip the process of step S21. As a result, the map data 68 for the last performed map display process is saved until the next map display process is performed, and therefore by the process of step S24, information about the map displayed before the space image can be stored. As a result, when the next map display process is performed, the stored map, i.e., the last displayed map, is displayed first. Specifically, when the space image is displayed and the stored map data 68 represents the viewing direction map, the viewing direction map is displayed in response to the map display operation. Also, when the space image is displayed and the stored map data 68 represents the fixed direction map, the fixed direction map is displayed in response to the map display operation. Note that when the first map display process is performed after the game process shown in FIG. 14, a predetermined map (e.g., the viewing direction map) is displayed. Furthermore, in another embodiment, the content of the map data 68 may be reset when the virtual space represented by the last displayed map differs from the virtual space represented by the next map to be displayed (e.g., when a stage change occurs), while the map data 68 may be saved when there is no difference between the virtual spaces.

(Variant on the Game System)

While the above embodiment has been described with respect to the case where a series of processes for displaying the space image and the map are performed by a single apparatus (the game apparatus 3), in another embodiment, the series of processes may be performed by an information processing system consisting of a plurality of information processing devices. For example, in an information processing system including a terminal-side device and a server-side device capable of communicating with the terminal-side device via a network, part (e.g., the game progression process of step S5) of the series of processes may be performed by the server-side device. Also, in the information processing system, a server-side system may consist of a plurality of information processing devices, which share the processes to be performed on the server side.

As described above, the present invention is applicable to, for example, game apparatuses and programs with a view to present a virtual space map in a more comprehensible manner.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program to be executed in a computer of an information processing device for displaying a map representing a virtual space on a screen, the program causing the computer to perform functionality comprising:
   a virtual space display portion for displaying a virtual space image of the virtual space as viewed from a viewing direction set by an operation of a user;
   a first map display portion for changing the image displayed on the screen to display a first map in response to a first condition being satisfied, such that an upward direction on the first map displayed on the screen is set to a viewing direction of the virtual space image, which is freely set by the user before the first map is displayed; and
   a second map display portion for changing the image displayed on the screen to display a second map in response to a second condition being satisfied, such that a fixed direction in the virtual space is set to the upward direction on the second map displayed on the screen.

2. The non-transitory storage medium according to claim 1, wherein,
   the first map display portion displays the first map in response to the first condition being satisfied when the image of the virtual space is being displayed, and
   the second map display portion displays the second map in response to the second condition being satisfied when the first map is being displayed.

3. The non-transitory storage medium according to claim 1, wherein the second map represents a wider range than the first map.

4. The non-transitory storage medium according to claim 1, wherein,
   the first map display portion displays the first map in a screen area where the image of the virtual space is displayed, and
   the second map display portion displays the second map in the screen area where the image of the virtual space is displayed.

5. The non-transitory storage medium according to claim 1, wherein,
   the information processing program further causes the computer to perform functionality comprising a virtual camera setting portion for setting a virtual camera in the virtual space in accordance with a user's operation, and
   the virtual space display portion displays the image of the virtual space using a viewing direction of the virtual camera set by the virtual camera setting portion as the predetermined viewing direction.

6. The non-transitory storage medium according to claim 5, wherein,
   the information processing program further causes the computer to perform functionality comprising an object action control portion for controlling movement of an object in the virtual space in accordance with the user's operation,
   the virtual camera setting portion sets the viewing direction of the virtual camera based on either a position or a direction of the object, or both,
   the first map display portion displays an image representing the position of the object in the virtual space on the first map, and
   the second map display portion displays an image representing the position of the object in the virtual space on the second map.

7. The non-transitory storage medium according to claim 2, wherein,
   the first map display portion displays the first map in response to a user giving a first instruction when the second map is being displayed, and
   the virtual space display portion displays the image of the virtual space in response to the user giving a second instruction when the second map is being displayed.

8. The non-transitory storage medium according to claim 1, wherein,
   the virtual space display portion displays the image of the virtual space in response to a predetermined third condition, which is identical to or different from the first and second conditions, being satisfied when the first or second map is being displayed,
   the information processing program further causes the computer to perform functionality comprising a storage portion for storing information about a map displayed before the image of the virtual space,
   the first map display portion displays the first map in response to the first condition being satisfied when the image of the virtual space is being displayed and the storage portion has information about the first map stored therein, and
   the second map display portion displays the second map in response to the second condition being satisfied when the image of the virtual space is being displayed and the storage portion has information about the second map stored therein.

9. The non-transitory storage medium according to claim 8, wherein,
   the first map display portion displays the first map in response to a user giving an instruction when the second map is being displayed, and
   the second map display portion displays the second map in response to the user giving an instruction when the first map is being displayed.

10. The non-transitory storage medium according to claim 9, wherein,
    the information processing program further causes the computer to perform functionality comprising:
    a first position receiving portion for accepting a first position specification instruction from the user when the image of the virtual space is being displayed, the first position specification instruction specifying a position in the virtual space; and
    a first marker setting portion for setting a predetermined marker object in the position specified by the first position specification instruction, the predetermined marker object being higher than any other object set in the virtual space, and
    the first map display portion displays a predetermined marker image in a position on the first map that corresponds to the position specified by the first position specification instruction.

11. The non-transitory storage medium according to claim 1, wherein,
    the information processing program further causes the computer to perform functionality comprising:
    a second position receiving portion for accepting a second position specification instruction from a user when the first map is being displayed, the second position specification instruction specifying a position on the first map; and
    a second marker setting portion for setting a predetermined marker object in a position in the virtual space that corresponds to the position specified by the second position specification instruction, the predetermined marker object being higher than any other object set in the virtual space, and the first map display portion displays a predetermined marker image in the position specified by the second position specification instruction.

12. The non-transitory storage medium according to claim 1, wherein, the virtual space display portion displays the image of the virtual space with the viewing direction changed to a downward direction in the virtual space in response to an instruction to display the first map, and the first map display portion displays the first map in place of the image of the virtual space being displayed with the viewing direction changed to the downward direction.

13. The non-transitory storage medium according to claim 1, wherein, the virtual space display portion displays the image of the virtual space when an instruction is given to display the first map, such that the viewing direction is changed to a downward direction in the virtual space and the image of the virtual space gradually fades over time, and when the instruction is given to display the first map, the first map display portion displays the first map so as to gradually become sharp.

14. The non-transitory storage medium according to claim 1, wherein, the information processing program further causes the computer to perform functionality comprising a rotational display portion for gradually rotating the first map from the viewing direction to a direction preset in the virtual space in response to the second condition for displaying the second map being satisfied when the first map is being displayed, and the second map display portion displays the second map after the first map is rotated by the rotational display portion.

15. An information processing system for displaying a map representing a virtual space on a screen, comprising:

a memory; and one or more processors operatively associated with the memory and configured to perform functionality comprising:

display a virtual space image of the virtual space as viewed from a viewing direction set by an operation of a user;

change the image displayed on the screen to display a first map in response to a first condition being satisfied, such that an upward direction on the first map displayed on the screen is set to a viewing direction of the virtual space image, which is freely set by the user before the first map is displayed; and change the image displayed on the screen to display a second map such that a fixed direction in the virtual space is set to the upward direction on the second map displayed on the screen in response to a second condition being satisfied.

16. An information processing device for displaying a map representing a virtual space on a screen, comprising:

a virtual space display portion for displaying a virtual space image of the virtual space as viewed from a viewing direction set by an operation of a user;

a first map display portion for changing the image displayed on the screen to display a first map in response to a first condition being satisfied, such that an upward direction on the first map displayed on the screen is set to a viewing direction of the virtual space image, which is freely set by the user before the first map is displayed; and a second map display portion for changing the image displayed on the screen to display a second map such that a fixed direction in the virtual space is set to the upward direction on the second map displayed on the screen in response to a second condition being satisfied.

17. A map display method for displaying a map representing a virtual space on a screen, comprising:

displaying a virtual space image of the virtual space as viewed from a viewing direction;

changing the image displayed on the screen to display a first map in response to a first condition being satisfied, such that an upward direction on the first map displayed on the screen is set to a viewing direction of the virtual space image, which is freely set by the user before the first map is displayed; and changing the image displayed on the screen to display a second map such that a fixed direction in the virtual space is set to the upward direction on the second map displayed on the screen in response to a second condition being satisfied.

* * * * *